United States Patent
Gedlinske et al.

(10) Patent No.: US 7,035,748 B2
(45) Date of Patent: *Apr. 25, 2006

(54) PRIORITY SYSTEM AND METHOD FOR PROCESSING STANDARDIZED TESTS

(75) Inventors: Mark Gedlinske, Plymouth, MN (US); Doyle Kirkeby, Chanhassen, MN (US); Michelle Edenborg, Minnetonka, MN (US)

(73) Assignee: Data Recognition Corporation, Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/894,560

(22) Filed: Jul. 20, 2004

(65) Prior Publication Data

US 2004/0267500 A1    Dec. 30, 2004

Related U.S. Application Data

(63) Continuation of application No. 10/153,444, filed on May 21, 2002, now Pat. No. 6,772,081.

(51) Int. Cl.
G06F 19/00 (2006.01)
G06F 9/46 (2006.01)

(52) U.S. Cl. ...................... 702/108; 718/103
(58) Field of Classification Search ........... 702/179, 702/108, 120; 434/322; 718/103
See application file for complete search history.

(56) References Cited

U.S. PATENT DOCUMENTS

| | | | |
|---|---|---|---|
| 4,120,049 A | 10/1978 | Thaler et al. | 365/230 |
| 4,437,838 A | 3/1984 | Tauber et al. | 434/363 |
| 4,478,584 A | 10/1984 | Kaney | 434/353 |
| 4,705,479 A | 11/1987 | Maron | 434/335 |
| 4,708,503 A | 11/1987 | Poor | 400/531 |

(Continued)

FOREIGN PATENT DOCUMENTS

EP        0 107 010 B1      3/1994

(Continued)

OTHER PUBLICATIONS

""Score Image" Processing of Constructed-Responses, Essays, and Writing Samples", *UNISCORE, Incorporated*, (1992),3 pgs.

"Image Processing of Open-Ended Questions", *UNISCORE, Incorporated*, (1992),4 pgs.

Anderson, Jonathan, "The Role of the Computer in Assessment: Recent Developments in Australia [Journal Paper]", *Journal of Educational Processing, 10(1-2)*, (1973),4-11.

Brown, Peter , et al., "Validation: Cost effective external evaluation", *Australian Journal of Education Technology, 6(2)*, (1990),1-6.

(Continued)

*Primary Examiner*—Bryan Bui
*Assistant Examiner*—Toan M. Le
(74) *Attorney, Agent, or Firm*—Schwegman, Lundberg, Woessner & Kluth, P.A.

(57) ABSTRACT

Systems and methods are provided for prioritizing the processing of standardized tests. One aspect of the present subject matter relates to a method for processing completed standardized tests. In one embodiment, test-processing priority information is received, and is associated with machine-readable identifiers for standardized tests. Completed standardized tests are received, and are identified by reading machine-readable identifiers. The identified standardized tests are processed according to the associated test-processing priority information such that higher priority tests are automatically processed before lower priority tests. Other aspects are provided herein.

27 Claims, 16 Drawing Sheets

U.S. PATENT DOCUMENTS

| | | | |
|---|---|---|---|
| 4,813,077 A | 3/1989 | Woods et al. | 382/138 |
| 4,817,179 A | 3/1989 | Buck | 382/54 |
| 4,820,165 A | 4/1989 | Kanapa | 434/276 |
| 4,837,842 A | 6/1989 | Holt | 382/26 |
| 4,967,354 A | 10/1990 | Buchanan | 364/419 |
| 4,978,305 A | 12/1990 | Kraft | 434/353 |
| 5,046,005 A | 9/1991 | Vilardebo et al. | 364/419 |
| 5,321,611 A | 6/1994 | Clark et al. | 364/419.2 |
| 5,377,354 A * | 12/1994 | Scannell et al. | 718/103 |
| 5,386,482 A | 1/1995 | Basso et al. | 382/9 |
| 5,433,615 A | 7/1995 | Clark | 434/322 |
| 5,437,554 A | 8/1995 | Clark et al. | 434/322 |
| 5,445,369 A | 8/1995 | Golicz et al. | 271/3.23 |
| 5,452,379 A | 9/1995 | Poor | 382/317 |
| 5,458,493 A | 10/1995 | Clark et al. | 434/322 |
| 5,466,159 A | 11/1995 | Clark et al. | 434/322 |
| 5,531,429 A | 7/1996 | Clark | 270/58.11 |
| 5,558,521 A | 9/1996 | Clark et al. | 434/322 |
| 5,672,060 A | 9/1997 | Poor | 434/322 |
| 5,690,497 A | 11/1997 | Clark et al. | 434/322 |
| 5,709,551 A | 1/1998 | Clark et al. | 434/322 |
| 5,716,213 A | 2/1998 | Clark et al. | 434/322 |
| 5,718,591 A | 2/1998 | Clark et al. | 434/322 |
| 5,735,694 A | 4/1998 | Clark et al. | 434/322 |
| 5,752,836 A | 5/1998 | Clark et al. | 434/322 |
| 5,826,238 A * | 10/1998 | Chen et al. | 705/8 |
| 5,987,149 A | 11/1999 | Poor | 382/100 |
| 5,987,302 A | 11/1999 | Driscoll et al. | |
| 6,120,299 A | 9/2000 | Trenholm et al. | 434/323 |
| 6,155,839 A | 12/2000 | Clark et al. | 434/322 |
| 6,159,018 A | 12/2000 | Clark et al. | 434/322 |
| 6,168,440 B1 | 1/2001 | Clark et al. | 434/322 |
| 6,173,154 B1 | 1/2001 | Kucinski et al. | 434/359 |
| 6,181,909 B1 | 1/2001 | Burstein et al. | 434/353 |
| 6,183,260 B1 | 2/2001 | Clark et al. | 434/322 |
| 6,183,261 B1 | 2/2001 | Clark et al. | 434/322 |
| 6,193,521 B1 | 2/2001 | Clark et al. | 434/322 |
| 6,212,130 B1 | 4/2001 | Brazeal, Jr. et al. | 367/93 |
| 6,234,806 B1 | 5/2001 | Trenholm et al. | 434/322 |
| 6,256,399 B1 | 7/2001 | Poor | 382/100 |
| 6,267,601 B1 | 7/2001 | Jongsma et al. | 434/362 |
| 6,366,759 B1 | 4/2002 | Burstein et al. | 434/353 |
| 6,651,081 B1 * | 11/2003 | Salgado et al. | 718/103 |
| 6,772,081 B1 * | 8/2004 | Gedlinske et al. | 702/108 |
| 2002/0178244 A1 | 11/2002 | Brittenham et al. | 709/223 |

FOREIGN PATENT DOCUMENTS

| | | |
|---|---|---|
| EP | 0 374 127 B1 | 4/1995 |
| EP | 0 374 892 B1 | 4/1997 |
| WO | WO-90/04004 | 4/1990 |
| WO | WO-91/09734 | 7/1991 |

OTHER PUBLICATIONS

Burnett, Ginny, "System and Method for Reporting Test Results", U.S. Appl. No. 10/144,770, filed May 7, 2002, 46 pgs.

Cason, Gerald J., et al., "Integrated Test Scoring, Performance Rating and Assessment Records Keeping", *Innovations in Medical Education, Association of American Medical Colleges, Washington, D.C..,* Paper presented at the annual meeting of the Association of Medical Colleges., (Nov. 1, 1987),2-20.

Chesley, Jody , et al., "Integrated System for Electronic Tracking and Control of Documents", U.S. Appl. No. 10/140,768, filed May 7, 2002, 38 pgs.

Chesley, Jody , et al., "System for Generation of Statistical Examination Reports", U.S. Appl. No. 10/153,562, filed May 21, 2002, 53 pgs.

Chesley, Jody , et al., "System for Programmable Presentment of Scoring Tasks to a Plurality of Reviewers",U.S. Appl. No. 10/140,769, filed May 7, 2002, 40 pgs.

Epstein, Marion G., "Computer Assisted Assembly of Tests at Educational Testing Service", *Educational Technology*, (Mar. 1, 1973),23-24.

Feldker, Paul , "Online Computer Testing with Networked Apple II Microcomputers [Conference Paper]", *Conference on Computers in Physics Instruction. Proceedings. Addison-Wesley. Redwood City, CA, USA*, (1990),510-511.

Foxon, Marguerite , "Evaluation of training and development programs: A review of the literature", *Australian Journal of Educational Technology, 5 (2)*, (1989),1-16.

Garris, Michael D., et al., "NIST Scoring Package User's Guide Release 1.0", *NTIS, U.S. Department of Commerce, Technology Administration, National Institute of Standards and Technology*, Oct. 1992. NISTIR 4950,76 pgs.

Gathy, P , et al., "Computer-Assisted Self-Assessment (CASA) in Histology", *Computers Education.*, vol. 17, No. 2., (1991),109-116.

Gedlinske, Mark , et al., "Priority System and Method for Processing Standardized Tests", U.S. Appl. No. 10/153,444, filed May 21, 2002, 62 pgs.

Gedlinske, Mark , et al., "System and Method for Processing Forms Using Color", U.S. Appl. No. 10/364,758, filed Feb. 11, 2003, 39 pgs.

Gedlinske, Mark , et al., "System for Online Enrollment of Testing Candidates", U.S. Appl. No. 10/328,429, filed Dec. 23, 2002, 36 pgs.

Higgins, Colin A., et al., "Note-pad computers and the concept of Electronic Paper", *Information Services and Use*, vol. 11., (1991), 179-192.

Martz, Richard J., "Building the Computer Graphics Laboratory at Educational Testing Service [Conference Paper]", *Proceedings of NCGA's Computer Graphics 1987 Annual Conference and Exposition. Nat. Comput. Graphics Assoc. 1987*, vol. III. Fairfax, VA, USA, Princeton, NJ 08541, 194.

Assessment Records Keeping, *Innovations in Medical Education, Association of American Medical Colleges, Washington, D.C..,*Paper presented at the annual meeting of the Association of Medical Colleges., (Nov. 1, 1987),2-20.

Meredith, Joseph C., et al., "Student Feedback as a tool in computer-assisted instruction (CAI) frame development", *Scientia Paedagogica Experimentalis*, vol. 7 (2)., (1970), 221-302.

Mizokawa, Donald T., et al., "Guidelines for Compuer-Managed Testing", *Educational Technology*, Dec. 1984, 12-17.

Neuburger, Wayne F., "A Computer Support System for a Teacher Evaluation Model", *Paper presented at the National Association of Users of Computer Applications to Learning Conference*, (Oct. 28, 1976),2-16.

Orthner, Ph.D, Helmuth F., "Computer Systems in Medical Education", *Proceedings, The Sixth Annual Symposium on Computer Applications in Medical Care, George Washington University Medical Center*, (1982),1008-1010.

Pittman, James A., "Recognizing Handwritten Text [Conference Paper]", *Human Factors in Computing Systems. Reaching Through Technology. Conference Proceedings. ACM. 1991, New York, NY, USA.*, 271-275.

Reid-Green, Keith S., "A High Speed Image Processing System [Journal Paper]", *IMC Journal*, vol. 26, No. 2, Mar.-Apr., USA, (1990),12-14.

Sims, Rod, "Futures for computer-based training: Developing the learner-computer interface", *Australian Journal of Educational Technology, 4(2)*., (1988),1-11.

Sunouchi, Haruo, et al., "Computer-Assisted Retrieval and Analysis for Educational Test Items", *3rd USA-Japan Computer Conference, Waseda University, School of Science and Engineering, Tokyo, Japan*, (1978), 198-202.

Thompson, John M., et al., "Educational Testing Service, Where the business of graphics is analysis", *Computer Graphics World, Dec.*, (1986),57-61.

Zuckerman, Ronald A., "Optical Scanning for Data Collection, Conversion & Reduction", *NTIS, U.S. Department of Commerce, National Technical Information Service, Aug., Springfield, VA, USA*, (1967),49 pgs.

* cited by examiner

PRIORITY SYSTEM AND METHOD FOR PROCESSING STANDARDIZED TESTS

CROSS REFERENCE TO RELATED APPLICATIONS

This application is a continuation of application Ser. No. 10/153,444, filed on May 21, 2002, now issued as U.S. Pat. No. 6,772,081, the specification of which is incorporated herein by reference in its entirety.

This application is related to the following commonly assigned U.S. patent applications which are herein incorporated by reference in their entirety: "System For Programmable Presentment Of Scoring Tasks To A Plurality Of Reviewers," Ser. No. 10/140,769, filed on May 7, 2002; and "Integrated System For Electronic Tracking And Control of Documents," Ser. No. 10/140,768, filed on May 7, 2002.

TECHNICAL FIELD

This application relates generally to systems and methods for electronic tracking and control of documents, and more particularly to electronic tracking and control of standardized tests within a standardized test management system.

BACKGROUND

One method for evaluating the knowledge or skill of a person includes the use of standardized tests. For example, standardized tests are used to monitor the academic progress of students. Some standardized tests incorporate objective test questions that are answered by filling in an appropriate oval in an associated bubble-type answer sheet using a pencil. Some standardized tests include open-ended questions. Examples of open-ended questions in these tests include essay questions, fill-in-the-blank questions, fill-in-the-map questions, math questions, and motor skill questions in which a test taker draws geometric shapes. Open-ended questions, also referred to herein as scoring tasks or test items, are evaluated and scored by a human reviewer, also referred to herein as a reader.

A large number of completed standardized tests are received at a test-processing center from a number of test-taking centers. Many testing projects have various time constraints. These time constraints provide a complicating factor in processing the large number of tests.

There is a need in the art to provide improved systems and methods for processing completed standardized tests.

SUMMARY

The above mentioned problems are addressed by the present subject matter and will be understood by reading and studying the following specification. The present subject matter relates to systems and methods for prioritizing the processing of standardized tests. The present subject matter allows a test process to follow external time constraints, such as those time constraints provided by the customer. The present subject matter also allows a test process to follow internal time constraints, such as those time constraints designed for implementing efficient processing of the standardized tests. In one embodiment, external and internal refer to those time constraints provided outside of or within, respectively, a test-processing center.

One aspect of the present subject matter relates to a method for processing completed standardized tests. In one embodiment, test-processing priority information is received, and is associated with machine-readable identifiers for standardized tests. Completed standardized tests are received, and are identified by reading the machine-readable identifiers on the tests. The identified standardized tests are processed according to the associated test-processing priority information, such that higher priority tests are automatically processed before lower priority tests. In one embodiment, boxes of test booklets are received from a plurality of test-taking centers, and criteria are received to prioritize the processing of the test booklets. Bar codes for the received boxes are read to prioritize the processing of the received boxes according to the received criteria. Bar codes for the test booklets contained within the processed boxes are read to prioritize processing of the test booklets according to the received criteria. The test booklets are processed in preparation for scoring test items in the test booklets according to the received criteria, such that higher priority test booklets are processed before lower priority test booklets. The test items are scored according to the received criteria.

According to one embodiment, completed test items are electronically received from test-taking centers, and criteria are received to prioritize the processing of the test items. The test items are processed in preparation for scoring, and the test items are scored according to the criteria.

One aspect of the present subject matter relates to a system for processing completed standardized tests. According to one embodiment, the system includes reading device (s) and a server connected to the reading device(s). The reading device(s) machine-read test identifiers for tests. The server includes a database module and at least one applications module. The database module associates test identifiers with test-processing priority information. The applications module(s) processes standardized tests according to the test-processing priority information, such that higher priority tests are processed before lower priority tests.

These and other aspects, embodiments, advantages, and features will become apparent from the following description of the present subject matter and the referenced drawings.

DETAILED DESCRIPTION

Figure 1:
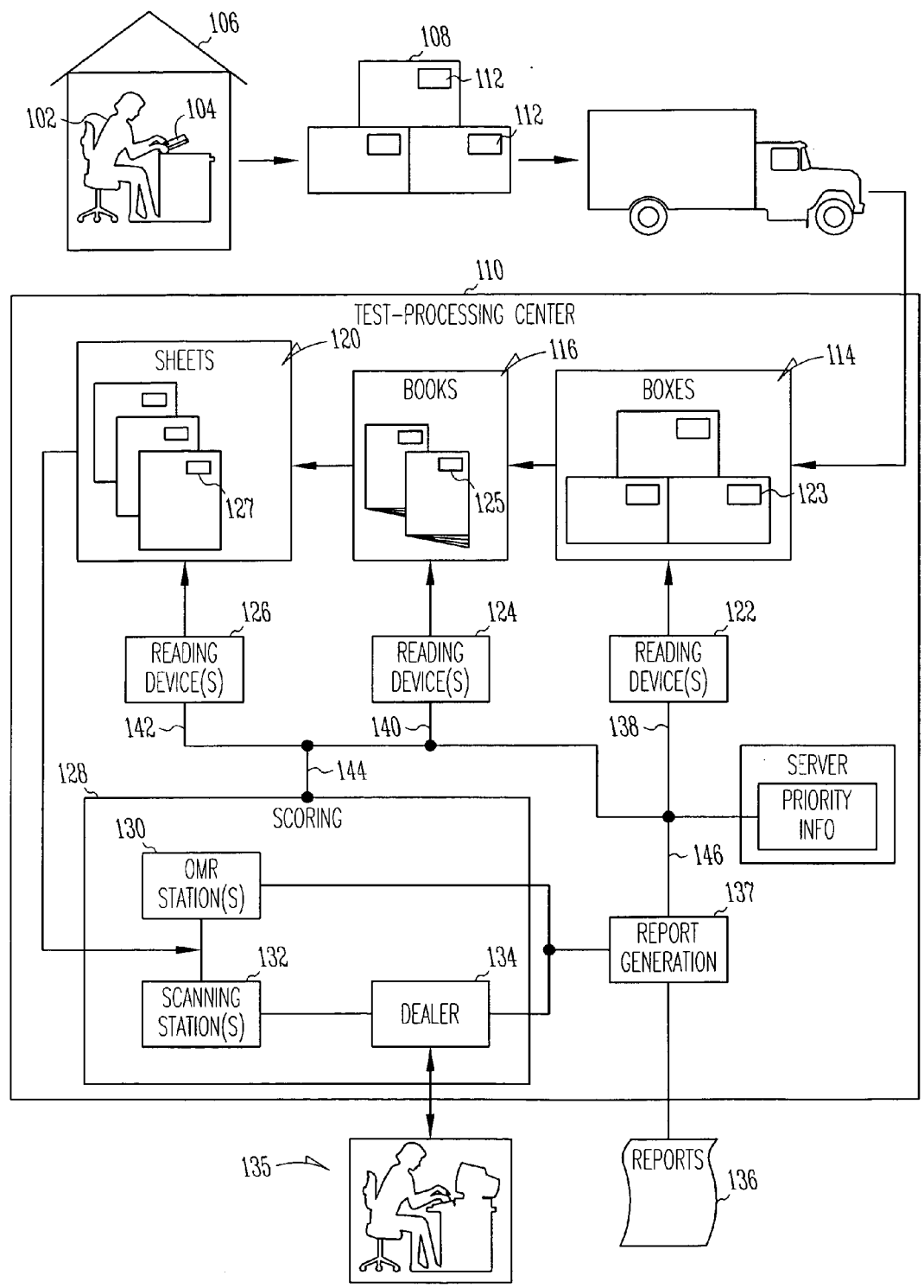
FIG. 1 illustrates a system for processing standardized tests that accounts for priority, according to one embodiment of the present subject matter.

The following detailed description refers to the accompanying drawings which show, by way of illustration, specific aspects and embodiments in which the present subject matter may be practiced. In the drawings, like numerals describe substantially similar components throughout the several views. These embodiments are described in sufficient detail to enable those skilled in the art to practice the present subject matter. Other embodiments may be utilized and structural, logical, and electrical changes may be made without departing from the scope of the present subject matter. The following detailed description is, therefore, not to be taken in a limiting sense, and the scope of the present subject matter is defined only by the appended claims, along with the full scope of equivalents to which such claims are entitled.

The present subject matter provides systems and methods for prioritizing the processing of standardized tests. The present subject matter allows a test process to accommodate time constraints, such as external time constraints and/or internal time constraints.

FIG. 1 illustrates a system for processing standardized tests that accounts for priority, according to one embodiment of the present subject matter. In the illustrated embodiment, as test-taker (e.g., a student) 102 completes a standardized test 104 at a test-taking center (e.g., a school) 106. In this embodiment, the standardized tests include test booklets. Each test booklet includes a number of pages that contain a number of test items or questions.

Completed test booklets are boxed, illustrated at 108, for shipping to a test-processing center 110. The boxes include an identifier 112, such as a bar code for example. Upon arriving at the test-processing center 110, the boxes of test booklets are unloaded at 114. The test booklets are removed from the boxes and sorted at 116. At 120, the test booklets are cut into loose pages. These loose pages are reconciled to ensure that all of the pages for each test booklet are accounted for. Reading devices 122, 124 and 126, such as bar code scanners for example, are used to read the identifiers 123 and identify the boxes, read the identifiers 125 and identify the test booklets, and read the identifiers 127 and identify the pages. In one embodiment, the optical mark recognition (OMR) scanner identifies the identifying markings for the pages.

The test pages are graded or scored at 128. In one embodiment, objective scoring tasks, such as multiple choice questions for example, are scored using optical mark recognition (OMR) scanners 130. In one embodiment, open-ended scoring tasks are scanned at scanning stations 132, are stored in a queue, and are distributed by dealer 134 to human readers 135 who evaluate the open-ended scoring tasks. Reports 136 of the score results are provided at 137.

A server in the test-processing center includes priority information. As illustrated via lines 138, 140, 142, 144 and 146, the priority information is available at various places along the process. In one embodiment, for example, the reading device(s) 122 determine which of the boxes should proceed for further processing before other boxes. In one embodiment, the reading device(s) 124 determine which of the test booklets should proceed for further processing before other test booklets. In one embodiment, the reading device(s) 126 determine which of the pages (or test items on the pages) should proceed for further processing before other pages (or test items on the pages). In one embodiment, for example, the priority information is used in the scoring system 128 to determine which test items should be scored before other test items. In one embodiment, for example, the priority information is used to determine which reports should be provided before other reports 136.

Figure 2:
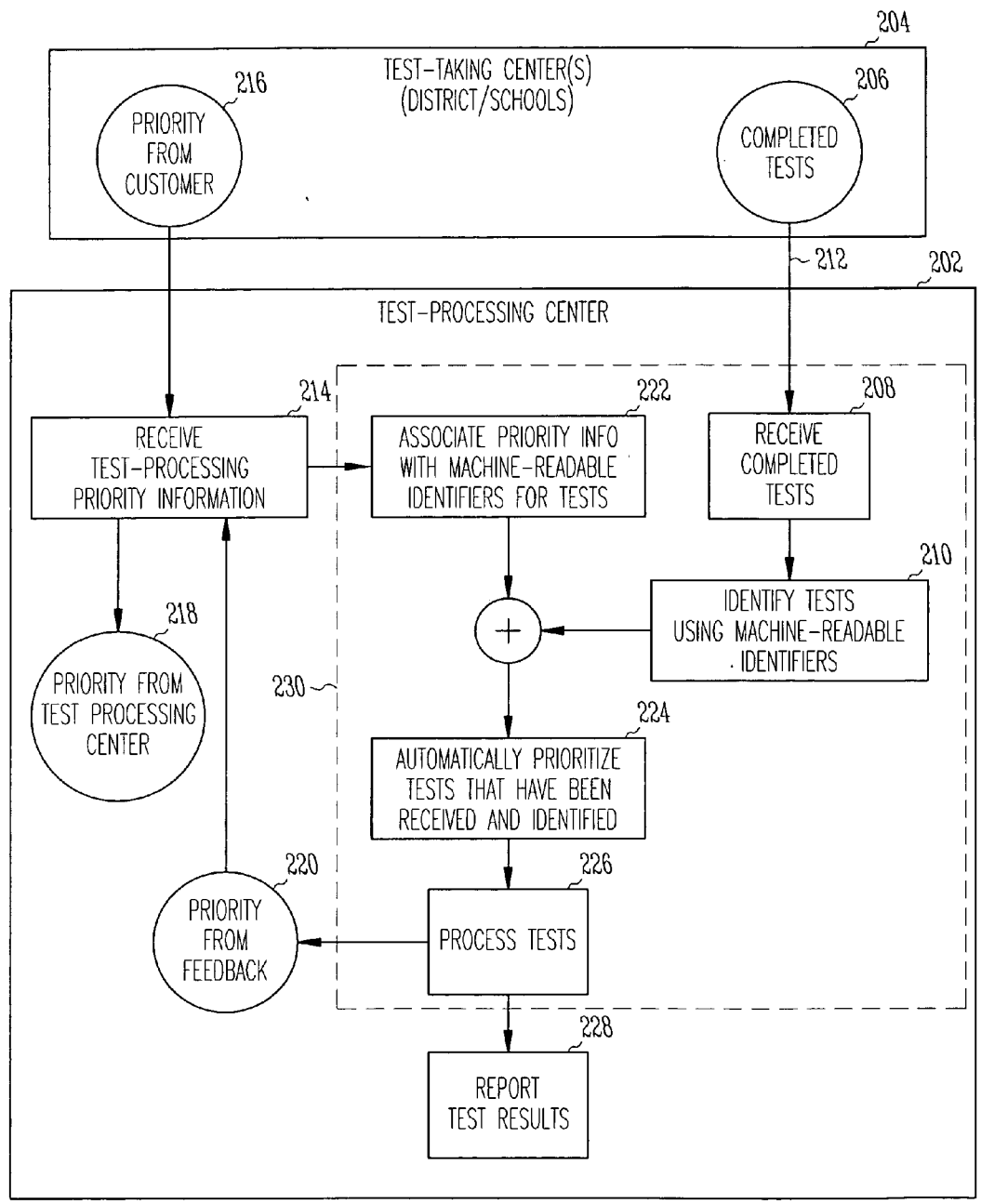
FIG. 2 illustrates one embodiment of a method for processing standardized tests that accounts for priority.

FIG. 2 illustrates one embodiment of a method for processing standardized tests that accounts for priority. The illustration shows a first location 202, represented as a test-processing center, where the standardized tests are received, processed and reported out. The illustration also shows a second location 204, represented as a test-taking center, where the standardized tests are completed by test takers and sent to the test-processing center. According to various embodiments, the test-taking center 204 includes a plurality of test-taking centers 202 at a plurality of locations. Additionally, according to various embodiments, the test-processing center includes a plurality of test-processing centers at a plurality of locations.

Completed tests, illustrated at 206, are received at the test-processing center at 208, and are identified at 210. In one embodiment, the tests are distributed, shown using line 212, using a courier service. In one embodiment, the tests are distributed in boxes from the test-taking center. In one embodiment, the tests include test booklets that contain a number of test items or questions, and these test booklets are distributed in boxes from the test-taking center. In one embodiment, the tests are distributed using transmission signals, such as electronic digital signals within the Internet computer network.

The received tests are identified using machine-readable identifiers. Machine-readable identifiers are identifying labels capable of being read by computers or other devices. In one embodiment, the machine-readable identifiers include bar codes. In one embodiment, the machine-readable identifiers include electronic identifiers for a transmitted signal representing the completed tests. One example of a transmitted signal includes a digital transmission. For example, in one embodiment, the electronic identifiers include tags that are capable of being read by a computer on the Internet global network. Systems and methods that use machine-readable identifiers that are based on other technology also are within the scope of the present subject matter.

At 214, test-processing priority information is received at the test-processing center. In one embodiment, this test-processing priority information indicates which tests should be processed first through various processing stages. According to various embodiments, this test-processing priority information indicates which boxes of test documents are a priority, which test documents are a priority, and/or which test items are priority in various test-processing stages.

In one embodiment, customer-provided priority information, represented at 216, is received. Customer-provided priority information 216 includes the customer's requirements for a test project. In one embodiment, for example, a state agency is able to prioritize the processing for a district, a school, a class, a student, a grade, a subject, a test item, a form and/or a material type.

According to various embodiments, the test-processing center provides priority information at 218 and/or 220. At 218, for example, the test-processing center is able to apply its own internal rules for prioritizing the processing the tests. For example, some open-ended questions are read by two different readers. After the first reader has read the test item, one internal rule provides that the second reading of the test item has an increased priority. At 220, for example, the test-processing center monitors the test-processing stages, and provides feedback to appropriately prioritize the processing of tests upstream to improve the overall efficiency of the system. For example, readers are qualified to read certain types of test items. It is desirable to maintain a steady workflow to the readers. Should the work for a particular reader run low, the feedback provides an indication to the upstream processes (such as box receipt and book receipt, described in more detail below) to prioritize the processing of certain boxes, test booklets, and test items to increase the workflow to that particular reader.

The priority information received at 214 is associated with machine readable identifiers for tests at 222. According to various embodiments, these machine readable identifiers include identifiers for boxes of tests, test booklets, and/or test items. The association of the identifiers and the priority information is maintained in a database. The tests that have been received at 208 and identified at 210 are automatically prioritized at 224. Computer instructions are used to automatically prioritize the tests. In one embodiment, the tests are automatically prioritized based on a start command provided as a user-input. In one embodiment, the tests are automatically prioritized at predetermined times, such as at periodic intervals (e.g. daily, hourly etc.), for example. In one embodiment, the tests are automatically correlated as test data are received and become available to be operated on by the computer instructions. The tests are processed at 226. In one embodiment, priority feedback information is provided at 220 based on the test processing. Test results are reported at 228.

In one embodiment, the automatic prioritization of tests at 224 dynamically occurs in a real time or near real time fashion. In various embodiments, for example, a number of processing stages are used to process received and identified tests. The relative priorities for these in-process tests are capable of being automatically modified at 224 when new priority information is received at 214 and associated with the identifiers at 222.

Figure 3:
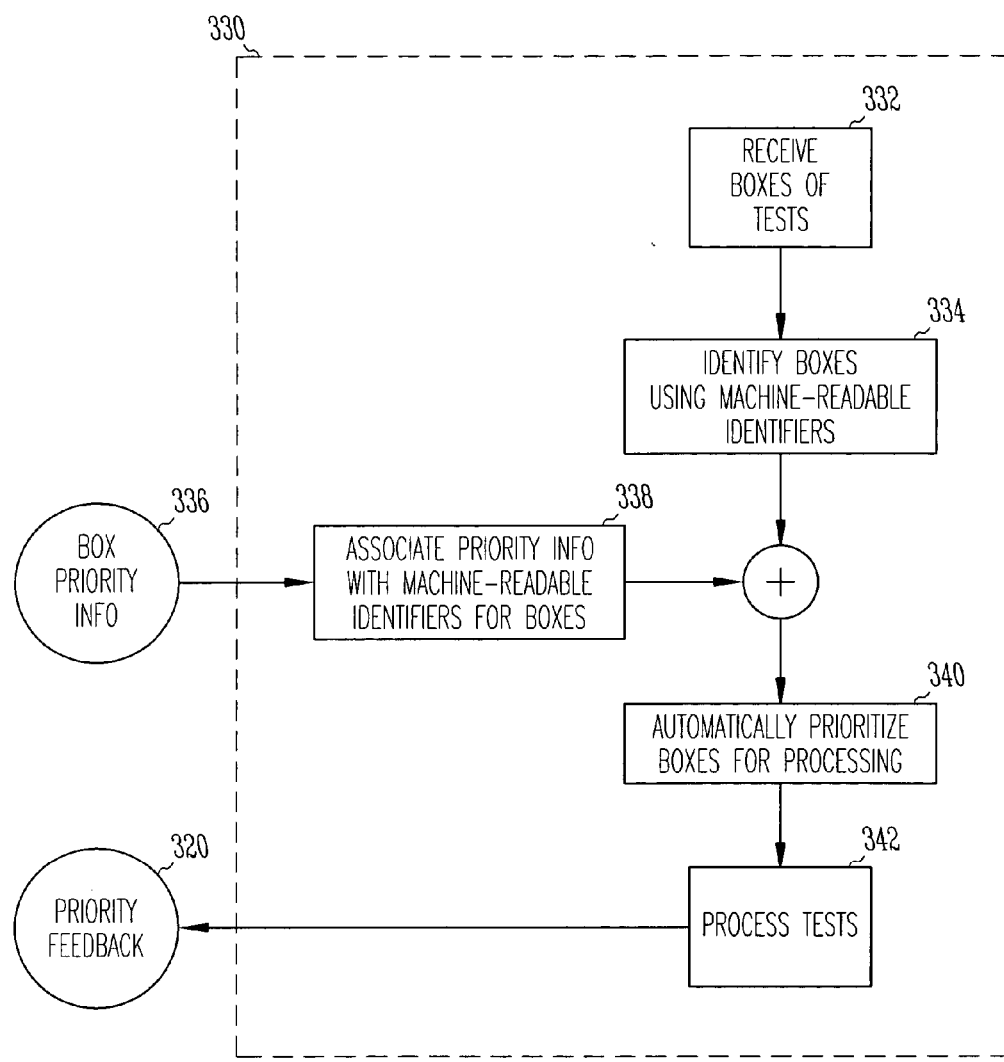
FIG. 3 illustrates one embodiment of a method for processing boxes of standardized tests that accounts for priority.

FIG. 3 illustrates one embodiment of a method for processing boxes of standardized tests that accounts for priority. In one embodiment, the method represented by the dotted line box 330 generally corresponds to the method represented by the dotted line box 230 in FIG. 2. Boxes of tests are received at 332. The term box, as used herein, includes various containers that are capable of being used to ship and receive the test documents. The term box is used to simplify the disclosure by using a well-known, easily-visualized shipping container. One of ordinary skill in the art will understand, upon reading and comprehending this disclosure and the attached claims, that the present subject matter is not limited to boxes or to any other type of shipping container, and that the term box as used in the claims is entitled to be interpreted as encompassing a full scope of equivalent shipping containers.

At 334, the boxes are identified using machine-readable identifiers. In one embodiment, the boxes are identified using bar code labels. Box priority information, represented generally at 336, is associated with machine-readable identifiers for boxes at 338. At 340, the associated priority information is used to automatically prioritize the received and identified boxes for processing. The tests contained within the prioritized boxes are processed at 342. In one embodiment, priority feedback information, as represented at 320, is provided.

Figure 4:
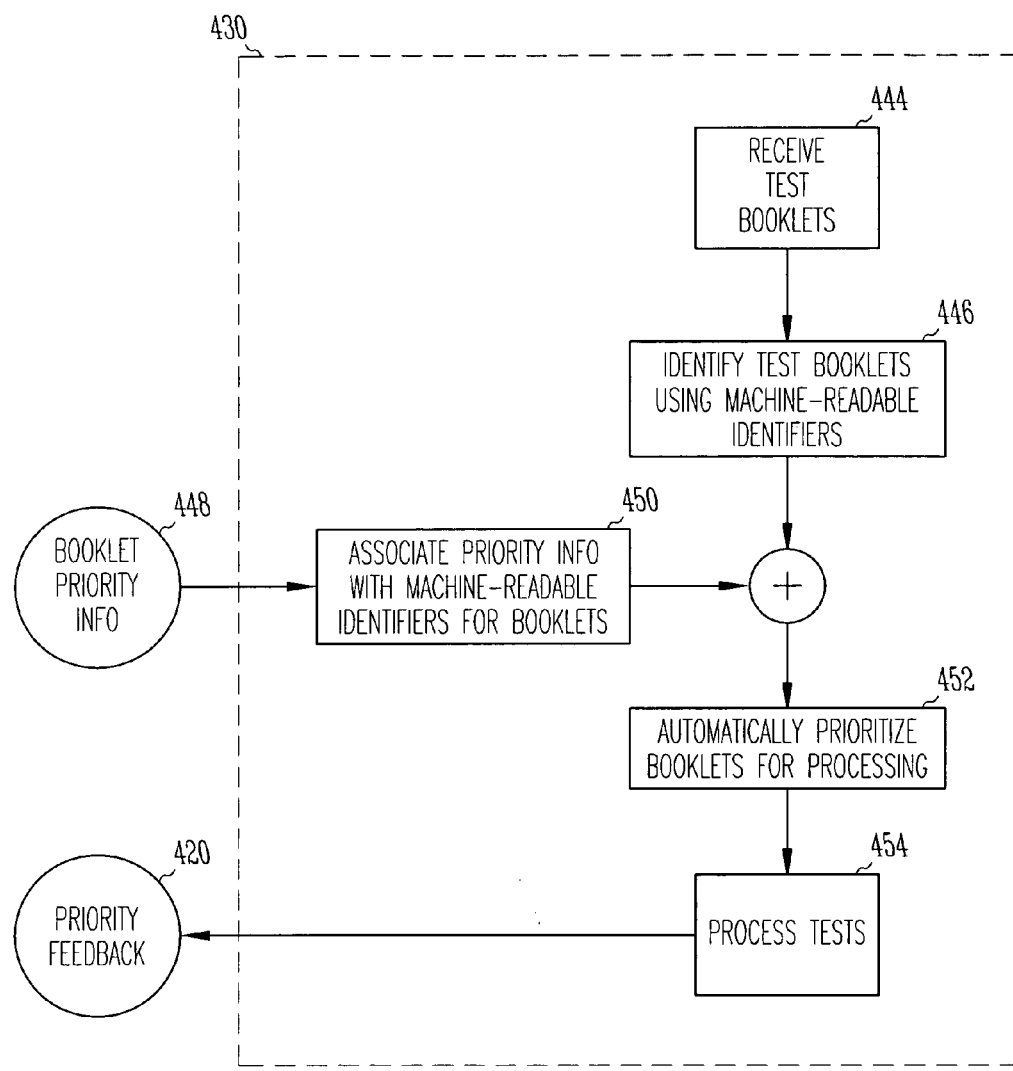
FIG. 4 illustrates one embodiment of a method for processing test booklets that accounts for priority.

FIG. 4 illustrates one embodiment of a method for processing test booklets that accounts for priority. In one embodiment, the method represented by the dotted line box 430 generally corresponds to the method represented by the dotted line box 230 in FIG. 2. Test booklets are received at 444. A test booklet includes a number of test items, or questions, assembled into a single document. Test booklets have a machine-readable document number, referred to in this context as a test booklet identifier.

At 446, the test booklets are identified using machine-readable identifiers. In one embodiment, the test booklets are identified using bar code labels as test booklet identifiers. Test booklet priority information, represented generally at 448, is associated with machine-readable identifiers for test booklets at 450. At 452, the associated priority information is used to automatically prioritize the received and identified test booklets for processing. The tests contained within the test booklets are processed at 454. In one embodiment, priority feedback information, as represented at 420, is provided.

Figure 5:
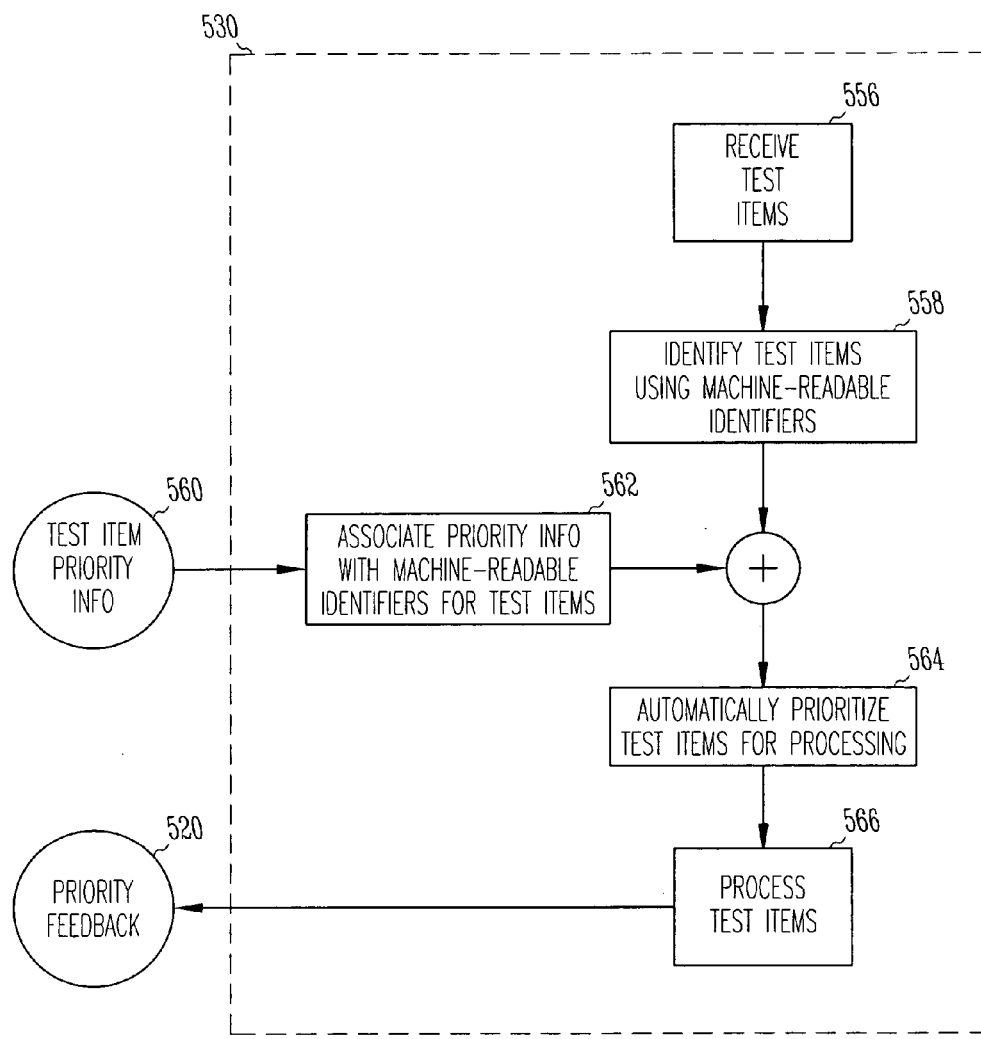
FIG. 5 illustrates one embodiment of a method for processing test items that accounts for priority.

FIG. 5 illustrates one embodiment of a method for processing test items that accounts for priority. In one embodiment, the method represented by the dotted line box 530 generally corresponds to the method represented by the dotted line box 230 in FIG. 2. Test items are received at 556. A test item includes test questions that are to be scored. In one embodiment, the test items are shipped from the test-taking center to the test-processing center. In one embodiment, the test items are transmitted via transmission signals from the test-taking center to the test-processing center. For example, the test items are securely transmitted through the Internet computer network in one embodiment. The test items have a machine-readable test item identifier. In one embodiment, the test item identifier is a bar code located on a tangible test item. In one embodiment, the bar code forms part of a scanned image of the test item, such that the scanned image and bar code are able to be transmitted via transmission signals. In one embodiment, the test item identifier is an electronic identifier, such as a tag, for an electronic transmission.

At 558, the test items are identified using machine-readable identifiers, examples of which were provided above. Test item priority information, represented generally at 560, is associated with machine-readable identifiers for test items at 562. At 564, the associated priority information is used to automatically prioritize the received and identified test items for processing. The test items are processed at 566. For example, one embodiment of processing the test items includes scoring the test items. In one embodiment, priority feedback information, as represented at 520, is provided.

Figure 6:
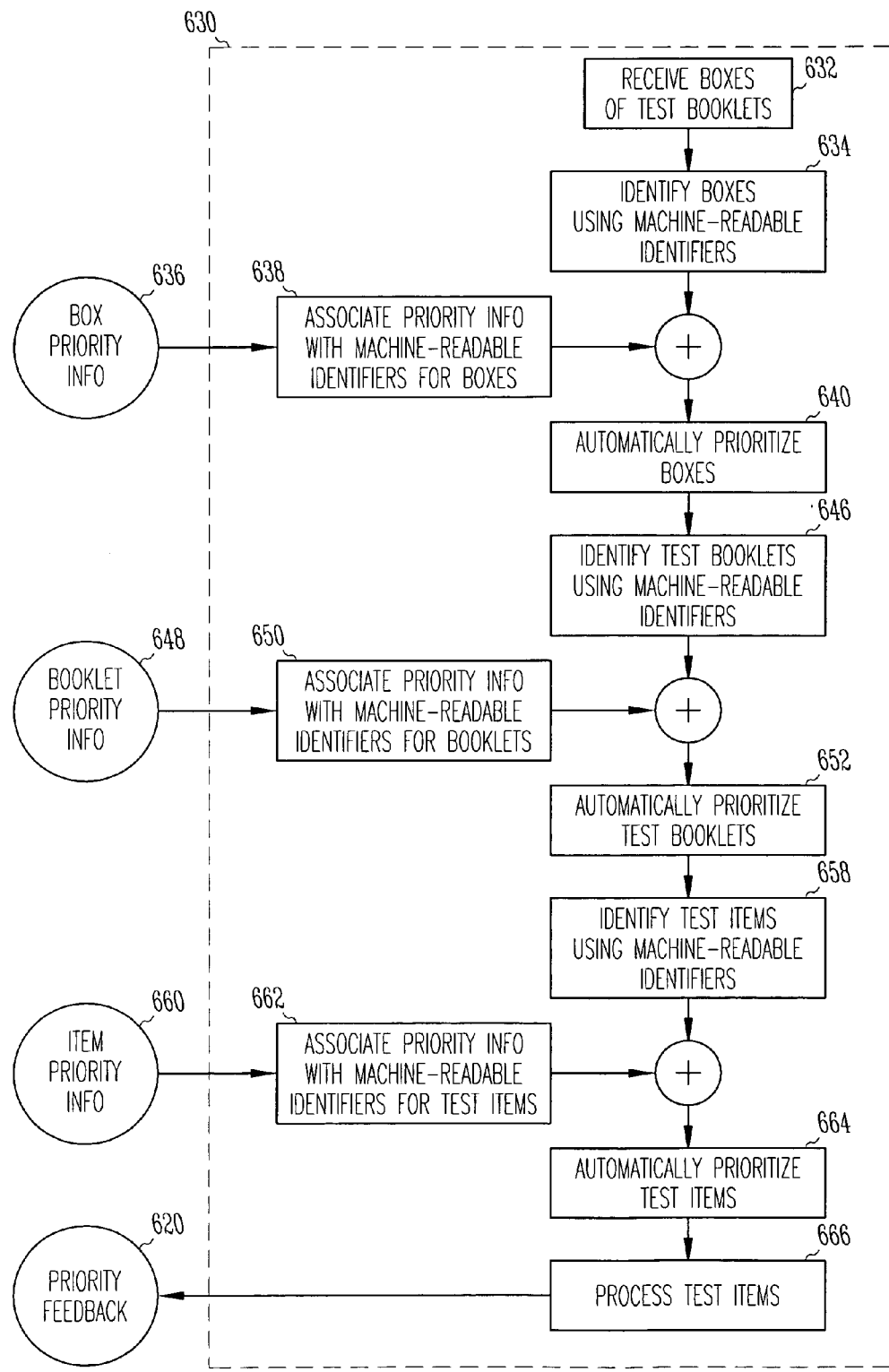
FIG. 6 illustrates one embodiment of a method for processing boxes of standardized test booklets that accounts for priority.

FIG. 6 illustrates one embodiment of a method for processing boxes of standardized test booklets that accounts for priority. In one embodiment, the method represented by the dotted line box 630 generally corresponds to the method represented by the dotted line box 230 in FIG. 2. Boxes of test booklets are received at 632. At 634, the boxes are identified using machine-readable identifiers. In one embodiment, the boxes are identified using bar code labels. Box priority information, represented generally at 636, is associated with machine-readable identifiers for boxes at 638. At 640, the associated priority information is used to automatically prioritize the received and identified boxes for processing. In one embodiment, the physical location of the boxes are tracked after they have been received. Should the box priority information change during processing, the higher priority boxes are able to be found, and the test booklets in the higher priority boxes are able to be distributed for further processing before the lower priority boxes.

At 646, the test booklets are identified using machine-readable identifiers. In one embodiment, the test booklets are identified using bar code labels as test booklet identifiers. Test booklet priority information, represented generally at 648, is associated with machine-readable identifiers for test booklets at 650. At 652, the associated priority information is used to automatically prioritize the received and identified test booklets for processing. In one embodiment, the physical location of the test booklets are tracked after they have been received. Should the test booklet priority information change during processing, the higher priority test booklets are able to be found, and the test items in these higher priority test booklets are able to be distributed for further processing before the lower priority test booklets.

At 658, the test items are identified using machine-readable identifiers. Examples of machine-readable identifiers for test items were provided above. Test item priority information, represented generally at 660, is associated with machine-readable identifiers for test items at 662. At 664, the associated priority information is used to automatically prioritize the received and identified test items for processing. The test items are processed at 666. For example, one embodiment of processing the test items includes scoring the test items. In one embodiment, priority feedback information, as represented at 620, is provided. According to various embodiments, this priority feedback information is used to generate the box priority information 636, the test booklet priority information 648, and/or the test item priority information 660.

Figure 7:
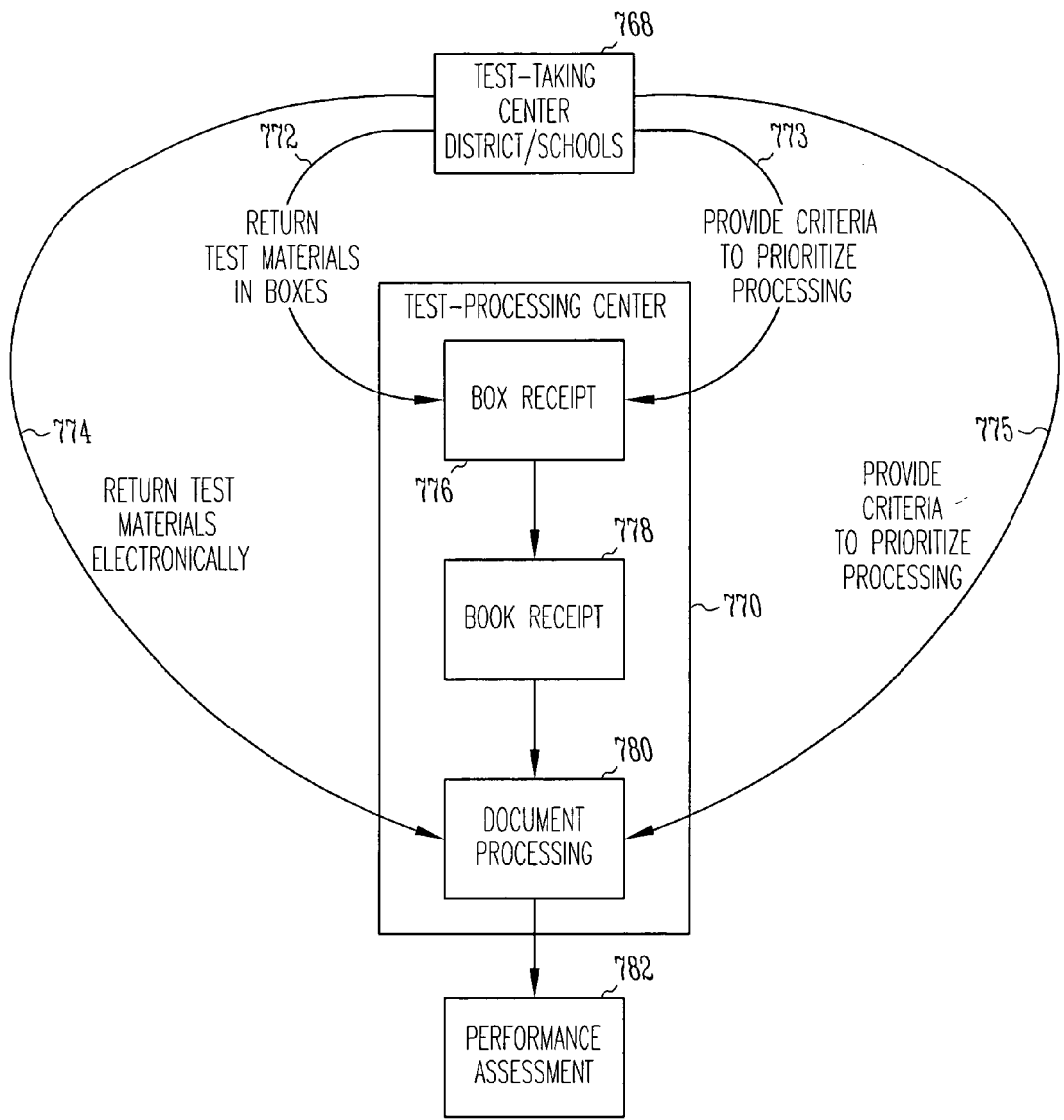
FIG. 7 illustrates a process flow for one embodiment of a system for processing standardized tests.

FIG. 7 illustrates a process flow for one embodiment of a system for processing standardized tests. Test-taking centers are represented as district/schools at 768. Completed standardized test materials, referred to generally herein as tests, are returned to the test-processing center at 770. In one embodiment, the tests are returned from the test-taking center 768 to the test-processing center 770 in boxes, as represented generally by 772. In one embodiment, the tests are returned from the test-taking center 768 to the test-processing center 770 electronically using transmission signals, as represented generally by 774.

In an embodiment in which the tests are returned to the test-processing center in boxes 772, a box receipt process 776 is performed on the boxes. In one embodiment, the shipped boxes are identified by reading a machine-readable identifier, such as by scanning a bar code, for example. The identified boxes that have a higher priority are distributed for further processing before the identified boxes that have a lower priority. The figure illustrates customer-provided priority information 773 being received from the test-taking center 768.

In one embodiment, the boxes contain test booklets. The test booklets are unpacked, and a book receipt process is performed at 778. In one embodiment, the test booklets are identified by reading a machine-readable identifier, such as by scanning a bar code or by detecting identifying markings (e.g., filled-in ovals) on the test booklets using optical mark recognition (OMR) logic. The identified test booklets that have a higher priority are distributed for further processing before the identified test booklets that have a lower priority.

At 780, document processing is performed on the test booklets to prepare the test booklets to be scored. The test booklets include test items. A performance assessment process is performed at 782 to score the test items. In one embodiment, the test items are scored using OMR logic for objective (e.g., multiple choice) test items, and using readers for open-ended test items. One example of a performance assessment process is provided in the co-pending, commonly assigned U.S. patent application entitled "System For Programmable Presentment Of Scoring Tasks To A Plurality Of Reviewers," Ser. No. 10/140,769, filed on May 7, 2002, which was previously incorporated by reference in its entirety.

In one embodiment, the priority information is provided using numerical priority. For example, in one embodiment, a priority 2 indicates a higher priority than a priority 4. In this embodiment, a priority 3 indicates a lower priority than a priority 2, and a higher priority than a priority 4. One of ordinary skill in the art will understand, upon reading and comprehending this disclosure, that a priority level is capable of being assigned to boxes, test booklets and/or test items.

In one embodiment, priority information is flagged at a district/school level. In various embodiments, priority is capable of being set for classes, grades, subjects and test items. According to various embodiments, the priority information is fed to a number of systems or processes throughout the test-processing center. In one embodiment, a relational database system is used to relate a priority to a box of tests, a priority to a test booklet and/or a priority to a test item, such that the priority is capable of being used to efficiently process boxes, booklets and/or test items.

In an embodiment in which the tests are returned to the test-processing center via a transmission signal 774, document processing 780 is performed on the transmitted tests to prepare the tests to be scored. According to various embodiments, for example, document processing for transmitted tests includes receiving the transmission, decoding the transmission, organizing or sorting the transmitted test items, and image processing. The figure illustrates customer-provided priority information 775 being received from the test-taking center 768. A performance assessment process is performed at 782 to score the test items.

Figure 8:
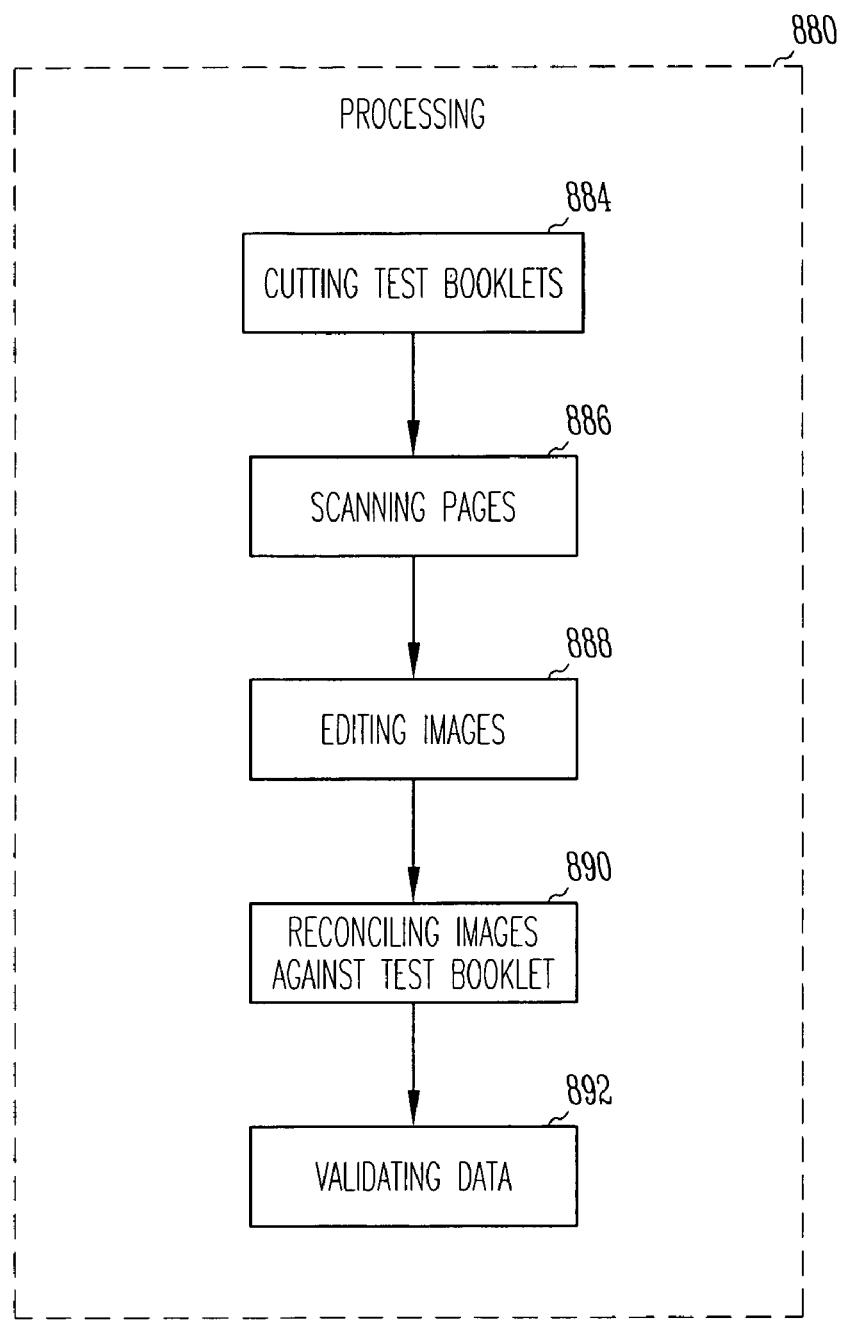
FIG. 8 illustrates one embodiment of a method for processing documents shown in the process flow of FIG. 7.

FIG. 8 illustrates one embodiment of a method for processing documents shown at 780 in the process flow of FIG. 7. In the illustrated embodiment 880, test booklets are cut at 884 to separate individual pages. These pages include a number of test items. At 886, the pages are scanned to provide electronic images of the pages. At 888, the electronic images are edited in preparation for scoring test items contained in the images. According to various embodiments, for example, the images are copied and cropped to provide individual images of each test item or group of test items. In other embodiments, the images are compressed, the background of the test pages is removed, the images are sharpened and cleaned up, and/or other template images are superimposed. Other image processing is performed in other embodiments. At 890, the images are reconciled against the test booklets to verify that all of the pages are in the system for each book. The reconciliation process determines if too few or too many pages are present. Discrepancies are investigated and corrected. At 892, data are validated. The validation is a higher level logic check on the data. According to various embodiments, for example, the logic ensures that each lithocode (also referred to as a security code) on test documents is unique, and that ensures that there are no duplicate precode data. According to various embodiments, precode data include student information such as name, age, education level, class, school and other information deemed relevant for reporting purposes. In one embodiment, precode data further include information regarding test requirements for individual test-takers. Examples of test requirements include, but are not limited to, the need for Braille or large print tests for individual test-takers. The precode data are associated with the security number. According to various embodiments, various precode data are printed on the tests along with the security code.

Figure 9:
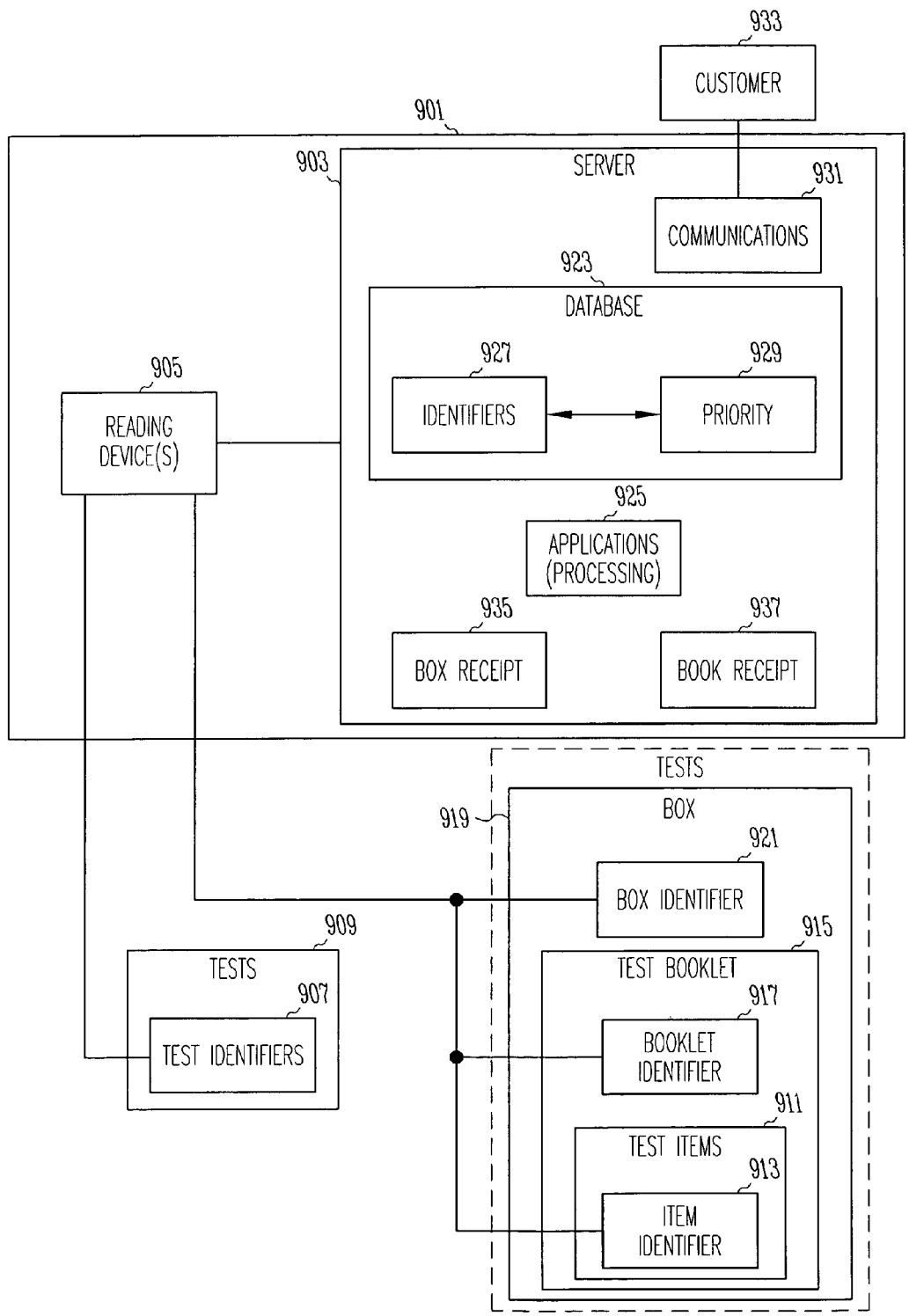
FIG. 9 illustrates one embodiment of a system for processing standardized tests.

FIG. 9 illustrates one embodiment of a system for processing standardized tests. The illustrated system generally includes a test-processing center 901, which generally includes a server 903 in communication with one or more reading devices 905. Machine-readable test identifiers 907 for tests are read by the reading device(s) 905. In one embodiment, the machine-readable identifiers 907 include bar codes, and the reading device(s) 905 include bar code scanners. In one embodiment, the machine-readable identifiers 907 include electronic identifiers for electronically transmitted tests. As one of ordinary skill in the art will understand upon reading and comprehending this disclosure, the present subject matter is not limited to a particular machine-readable technology.

In one embodiment, the tests include a number of test items 911. The test items 911 include item identifiers 913. The item identifiers are machine-readable identifiers such a bar codes or electronic identifiers, for example. In one embodiment, a number of the test items 911 form test booklets 915. The test booklets 915 include booklet identifiers 917 that are machine-readable identifiers such electronic identifiers, for example. In one embodiment, the test booklets 915 are shipped in boxes 919. The boxes 919 include box identifiers 921 that are machine-readable identifier such as bar codes, for example.

The server 903 includes a database module 923 and at least one applications module 925. The database module 923 associates test identifiers 927 with test-processing priority information 929. According to various embodiments, the database module 923 associates test item identifiers 913 with priority information for test items, associates test booklet identifiers 917 with priority information for test booklets, and/or associates box identifiers 921 with priority information for boxes. The applications module(s) 925 process the tests according to the test-processing priority information, such that higher-priority tests are processed before lower-priority tests.

In one embodiment, the test-processing priority information 929 includes priority information such as test-processing feedback information, provided by the test-processing center. In one embodiment, the test-processing priority information includes customer-provided priority information. One embodiment of the server 903 includes a communication module 931 for receiving test-processing priority information from a customer 933, such as a test-taking center, for example. In one embodiment, the communication module communicates with the customer through the Internet computer network.

Various embodiments of the server include a box receipt module 935 and/or a book receipt module 937. The box receipt module 935 identifies received boxes 919 by reading the identifiers 921 on the received boxes 919 using the reading device(s) 905. The box receipt module 935 also prioritizes the processing of the received boxes according to the test-processing priority information 929. The book receipt module 937 identifies received test booklets 915 by reading the identifiers 917 on the received booklets 915 using the reading device(s) 905. The book receipt module 937 also prioritizes the processing of the received test booklets according to the test-processing priority information 929.

The present subject matter provides a system for prioritizing the processing of standardized tests. Various embodiments for processing standardized tests include a number of sub-processes. Two sub-process embodiments are described below as examples. One sub-process, as shown and described with respect to FIGS. 11–15, relates to receiving boxes of test booklets. Another sub-process, as shown and described with respect to FIGS. 16–20, relates to the presentation of scoring tasks to readers.

Figure 10:
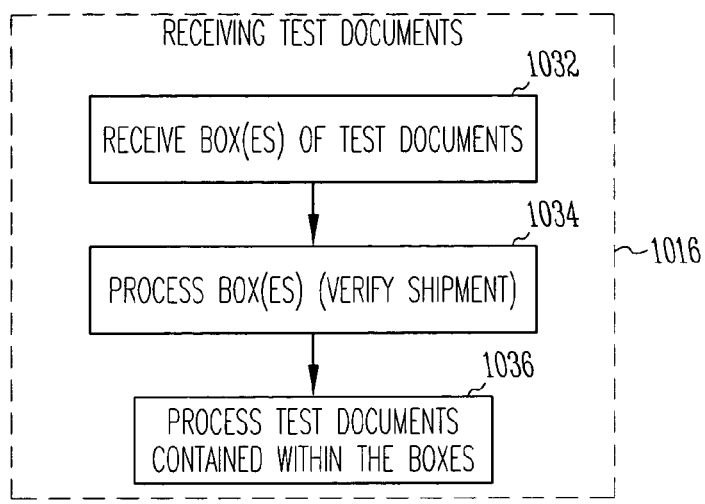
FIG. 10 illustrates one embodiment for receiving test documents from test-taking centers.

FIG. 10 illustrates one embodiment for receiving test documents from test-taking centers. In this embodiment 1016, one or more boxes of test documents (e.g., test booklets) sent from the test-taking centers are received at the test-processing center at 1032. The received box(es) are processed at 1034. In one embodiment, processing the received box(es) includes verifying that box(es) received at the test-processing center correspond to the boxes shipped from the test-taking centers. According to various embodiments, the verification process uses a variety of information sources including, among other things, documentation shipped with the boxes, courier tracking data, and/or information provided through an on-line update from the test-taking centers, identifying the boxes that had been shipped. One of ordinary skill in the art will understand, upon reading and comprehending this disclosure, that the priority information is capable of being used to prioritize the processing of the boxes and/or test documents.

Figure 11:
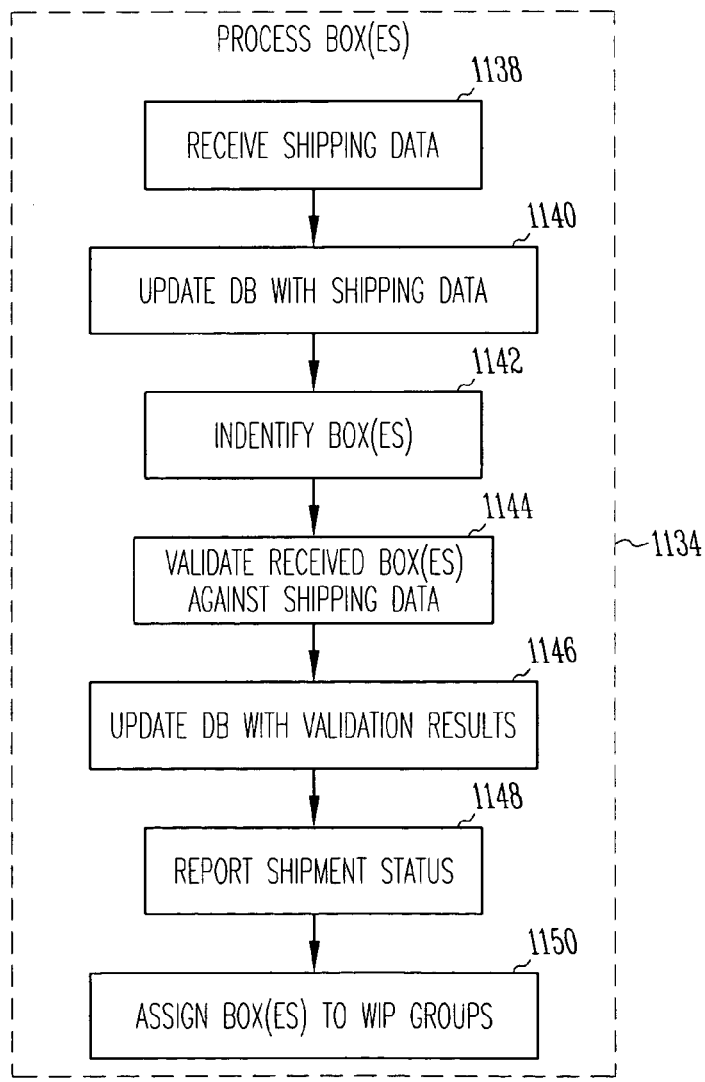
FIG. 11 illustrates one embodiment for processing box(es) as shown within the method of FIG. 9.

FIG. 11 illustrates one embodiment for processing box(es) as shown at 1034 within the method of FIG. 10. According to this embodiment 1134, shipping data is received at 1138. According to various embodiments, this shipping data is taken from, for example, documentation shipped with the boxes, courier tracking data, and/or information provided through an on-line update from the test-taking centers identifying the boxes that had been shipped. A database is updated with the received shipping data at 1140.

The received boxes are identified at 1142, and are validated against the received shipping data at 1144. One validation method involves counting the shipped boxes and the received boxes, and verifying that the number of shipped and received boxes are the same. One validation method involves labeling each of the shipped boxes with a unique identifier, and using the unique identifier to verify that a shipped box was received. According to one embodiment, the boxes are labeled with bar codes that represent a unique box identifier.

The database is updated with the validation results at 1146. This information is used to indicate discrepancies, that is, to indicate whether the one or more shipped boxes sent from the test-taking center have been received at the test-processing center. At 1148, the shipment status of the shipped and received boxes is reported to the appropriate people for detecting and resolving discrepancies.

At 1150, the boxes are assigned to Work-In-Progress (WIP) groups for further processing. According to one embodiment, the boxes of test documents are assigned to labeled pallets, which form the WIP groups. In one embodiment, the pallets are labeled with bar codes that represent unique pallet identifiers. Should the priority information change, the appropriate pallet or box on a pallet is capable of being found and processed expeditiously.

Figure 12:
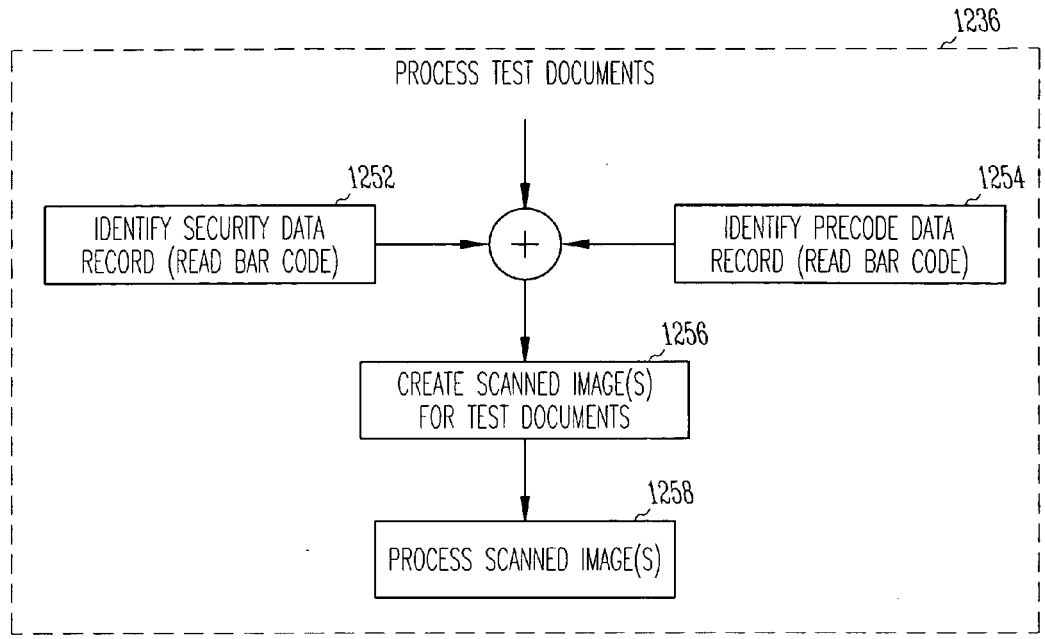
FIG. 12 illustrates one embodiment for processing test documents as shown within the method of FIG. 10.

FIG. 12 illustrates one embodiment for processing test documents as shown at 1036 within the method of FIG. 10. In this embodiment 1236, a security data record is identified for each of the test documents being processed at 1252, and a precode data record, if available, is identified for each of the test documents being processed at 1254. In various embodiments, the security data record and/or the precode data record is/are identified by reading a bar code.

A precode data record may not always be present on a received test document, because test-takers can move, for example, or can otherwise be added or deleted. In one embodiment, if a test-taker does not receive a test document with precode data, the test-taker completes one of a number of "extra" test documents that are distributed to the test-taking center along with the precoded test documents. Each of these extra test documents includes a unique secure test document identifier. A bar code or other marking indicates that a completed test document is not precoded, and thus needs to be processed to determine the student information that is to be associated with the secure document. In one embodiment, a test administrator from the test-taking center updates the test-taker population data with information identifying whether a test-taker completed a test document, and providing information for those test-takers who were not accounted for in the precode data.

At 1256, one or more scanned images for each of the received test documents are created. The scanned image(s) of the test documents are processed at 1258. One of ordinary skill in the art will understand, upon reading and comprehending this disclosure, that according to various embodiments, relative priorities affect the order of creating and processing scanned images.

In one embodiment, the scanned image(s) are processed using various image processing software and/or filters to score objective scoring tasks. In one embodiment, the scanned image(s) are processed using various image processing software and/or filters to score open-ended scoring tasks. In one embodiment, the scanned image(s) are processed using various image processing software and/or filters to score both objective and open-ended scoring tasks. In one embodiment, the open-ended scoring tasks are processed using artificial intelligence in a computer-based process. For example, handwritten answers are capable of being detected and deciphered into an answer, and artificial intelligence is applied to the answer to score the test item.

Figure 13:
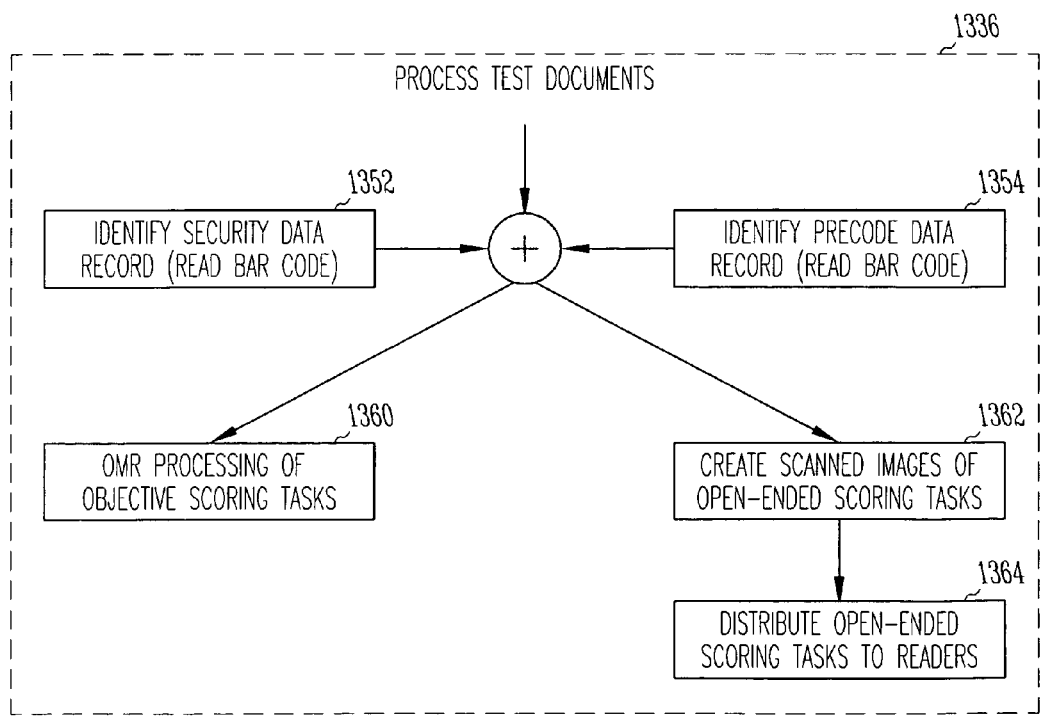
FIG. 13 illustrates one embodiment for processing test documents as shown within the method of FIG. 10.

FIG. 13 illustrates one embodiment for processing test documents as shown at 1036 within the method of FIG. 10. In this embodiment 1336, a security data record is identified for each of the test documents being processed at 1352, and a precode data record, if available, is identified for each of the test documents being processed at 1354. In various embodiments, the security data record and/or the precode data record is/are identified by scanning a bar code.

In the illustrated embodiment, an optical mark recognition (OMR) process is used to process objective scoring tasks at 1360. An OMR process is capable of detecting ovals or circles that have been filled in using a carbon-based pencil, for example. In one embodiment, the OMR process uses a filter to identify the position of the marks on the test document.

In the illustrated embodiment, scanned images of open-ended scoring tasks are created at 1362. Examples of open-ended questions in these tests include essay questions, fill-in-the-blank questions, fill-in-the-map questions, math questions, and motor skill questions in which a test taker draws geometric shapes. The open-ended scoring tasks are distributed to human readers at 1364. In one embodiment, the open-ended scoring tasks are distributed to human readers using a dealer system provided in the patent application entitled "System For Programmable Presentment Of Scoring Tasks To A Plurality Of Reviewers," Ser. No. 10/140,769, filed on May 7, 2002, which has been previously incorporated by reference in its entirety. One aspect of one embodiment of the dealer system involves, among other things, distributing the open-ended scoring tasks to readers based on a priority.

Figure 14:
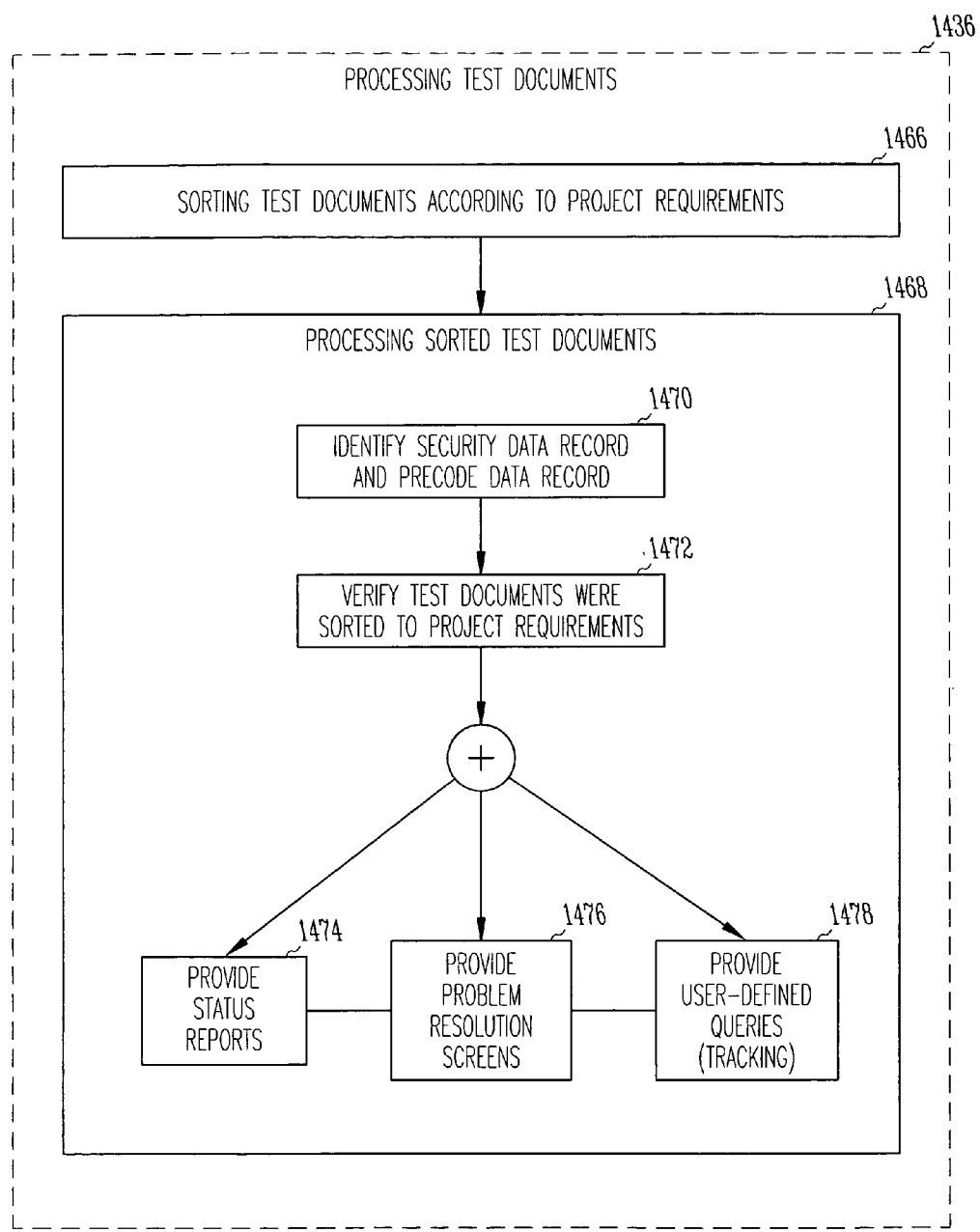
FIG. 14 illustrates one embodiment for processing test documents as shown within the method of FIG. 10.

FIG. 14 illustrates one embodiment for processing test documents as shown at 1036 within the method of FIG. 10. In this embodiment 1436, received test documents are sorted according to project requirements at 1466, and the sorted test documents are processed at 1468. In one embodiment, the received test documents are sorted into boxes (or reboxed) with like or similar test documents. In one embodiment, processing sorted test documents includes identifying a security data record and a precode data record as illustrated at 1470, and at 1472, verifying that the test documents were sorted according to the project requirements.

In one embodiment, as illustrated at 1474, processing the sorted plurality of standardized test documents includes providing a report for showing a status of the plurality of test documents contained in the received box(es). According to one embodiment, the status reports include verification information as to whether the test documents were sorted to project requirements. In one embodiment, as illustrated at 1476, processing the sorted plurality of standardized test documents includes providing problem resolution screens. These problem resolution screens, for example, guide a person through various decisions and/or actions and provide the user with options for resolving the discrepancies. In one embodiment, the problem resolution screens provide some of the more likely solution possibilities first, before providing other solution possibilities. Examples of discrepancies include documents that were not sorted to project requirements as represented at 1472, received documents that do not match the distributed documents, or distributed documents that do not match the received documents. In one embodiment, as illustrated at 1478, processing the sorted plurality of standardized test documents includes providing user-defined queries. One embodiment includes queries for tracking the secure test documents throughout processing.

Figure 15:
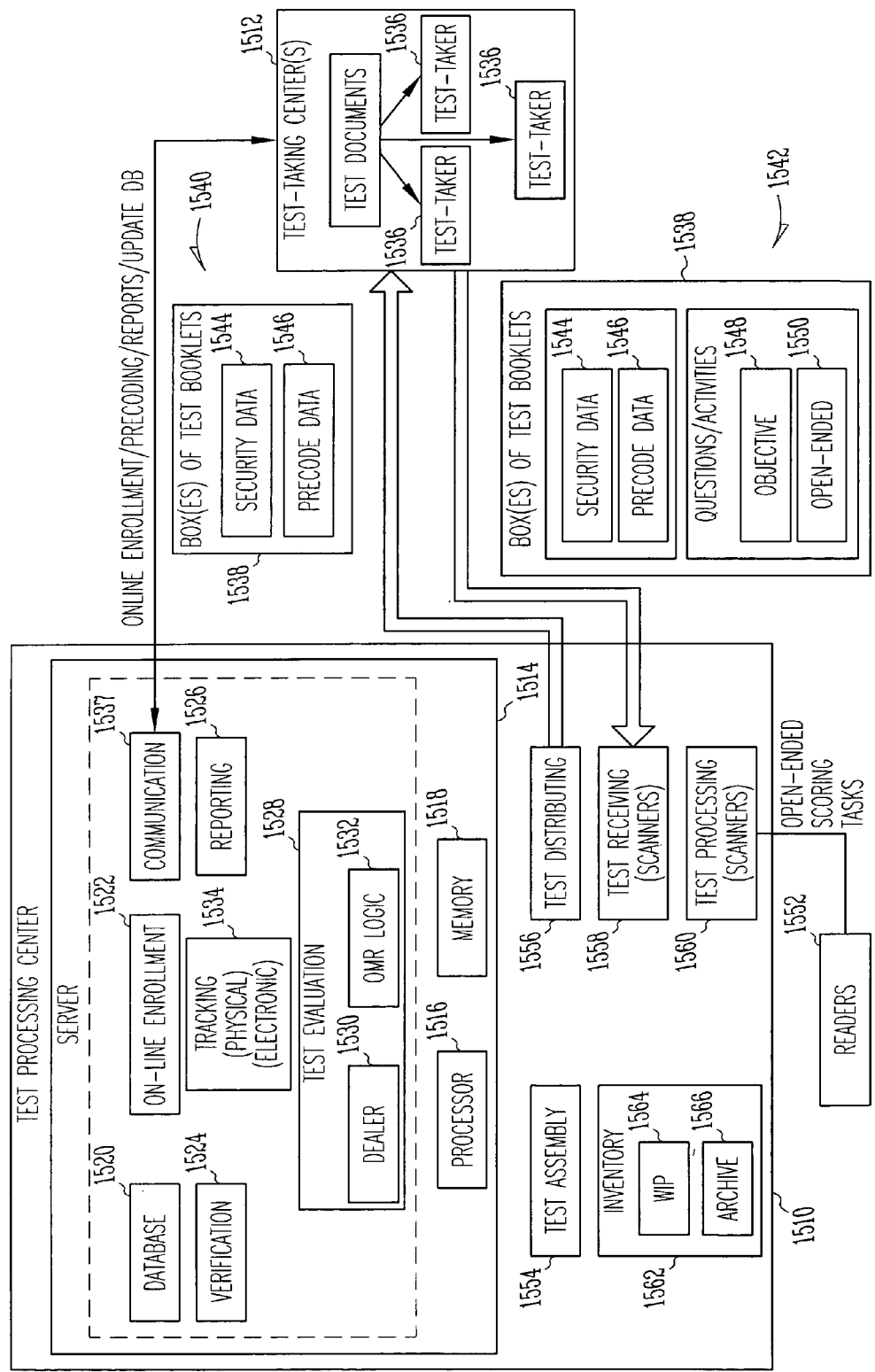
FIG. 15 illustrates one embodiment of a standardized test management system.

FIG. 15 illustrates one embodiment of a standardized test management system. The figure illustrates a test-processing center 1510 where standardized tests are assembled, distributed to test-taking centers, collected from test-taking centers and processed. FIG. 15 further illustrates a test-taking center 1512 where standardized tests are completed by test-takers. One of ordinary skill in the art will understand, upon reading and comprehending this disclosure, that the illustrated test-processing center encompasses one or more physical test-processing centers, and that the illustrated test-taking center encompasses one or more physical test-taking centers.

According to one embodiment, the tests are distributed and received via parcel post or other courier service. The test documents are shipped in boxes 1538 or other shipping containers. A number of the distributed test documents 1540 are identified with security data 1544 and precode data 1546. The received test documents 1542 may or may not be shipped in the same boxes in which they were distributed. In one embodiment, the boxes are labeled with a unique identifiers, such as a bar code. In addition to the security data 1544 and the precode data 1546, the received test documents 1542 include completed objective questions/activities 1548 and/or completed open-ended questions/activities 1550.

In one embodiment, the tests are distributed and received via a communication channel, such as through the Internet global network. In one embodiment, test-takers 1536 complete the test on-line through a communication channel. One of ordinary skill in the art will understand, upon reading and comprehending this disclosure, that in various embodiments the test-processing center 1510 includes one or more physical sites, and the test-taking centers 1512 include one or more physical sites.

The illustrated test-processing center 1510 includes a server 1514 that includes a processor 1516 in communication with a memory 1518. The illustrated server 1514 includes various functional modules. In one embodiment, these modules are contained within the memory 1518 and include instructions to be operated on by the processor 1516. One of ordinary skill in the art will understand that these functional modules can be formed from software, hardware, or various combinations of software and hardware.

In one embodiment, the server 1514 includes a database module 1520 for associating secure document data with test-taker data. One embodiment of the server includes an on-line enrollment module 1522 for a test administrator to populate test-taker data through on-line communication. One embodiment of the server includes a verification module 1524 for verifying received secure documents against distributed secure documents and the populated test-taker data. The verification module 1524 is capable of performing other verifications to promote the integrity of the system. One embodiment of the server includes a reporting module 1526 for reporting verification results from the verification module.

One embodiment of the server includes a test evaluation module 1528 for processing test answers and collecting test results. One embodiment of the test evaluation module 1528 includes a dealer module 1530, such as that provided in the patent application entitled "System For Programmable Presentment Of Scoring Tasks To A Plurality Of Reviewers," Ser. No. 10/140,769, filed on May 7, 2002, which has been previously incorporated by reference in its entirety. The dealer module 1530 distributes open-ended test items to readers 1552 and receives test scores from readers 1552. One embodiment of the test evaluation module 1528 includes optical mark recognition (OMR) logic 1532 for processing objective responses. In one embodiment, the reporting module 1526 reports test results from the test evaluation module.

One embodiment of the server includes a tracking module 1534 for tracking a location of physical secure documents. According to one embodiment, the tracking module 1534 also tracks electronic files representing secure documents.

One embodiment of the server 1514 includes a communication module 1537 to provide on-line communication with one or more test-taking centers 1512. One embodiment of the communication module 1537 provides on-line enrollment communication between the test-processing center 1510 and the one or more test-taking centers 1512. One embodiment of the communication module 1537 provides precoding communication between the test-processing center 1510 and the one or more test-taking centers 1512. One embodiment of the communication module 1537 provides report communication from the test-processing center 1510 to the one or more test-taking centers 1512. One embodiment of the communication module 1537 provides communication for updating a test-taker database from the one or more test-taking centers 1512.

One embodiment of the test-processing center 1510 includes a test assembly area 1554 or areas in which the secure test documents are assembled or otherwise prepared. The test assembly area is in communication with the server 1514, and in particular with the database 1520 in the server 1514, such that the security data and the associated precode data are properly printed on the secured test documents and identified in the database 1520.

One embodiment of the test-processing center 1510 includes a test distributing area or areas 1556, in which the tests are distributed from the test-processing center 1510 to the test-taking center(s) 1512. In one embodiment, the test distributing area 1556 includes one or more hand-held scanners or scanner stations for reading bar codes that represent the security data and the precode data. The test distributing area 1556 is in communication with the server 1514, and in particular with the database module 1520 and the tracking module 1534, to identify the test documents that are being shipped to the test-taking center(s). According to one embodiment, the verification module 1524 verifies that the desired test documents are being distributed to the test-taking center(s). According to one embodiment, the reporting module 1526 reports information regarding the shipped test documents.

One embodiment of the test-processing center 1510 includes a test receiving area or areas 1558, in which the tests are received from the test-taking center(s) 1512. In one embodiment, the test receiving area 1558 includes one or more hand-held scanners or scanner stations for reading bar codes that represent the security data and the precode data. In one embodiment, the scanners acquire a scanned image of the test document for processing in the test-processing area 1560. The test receiving area 1558 is in communication with the server 1514, and in particular with the database module 1520 and the tracking module 1534, to identify the test documents that are being shipped from the test-taking center (s) 1512 to the test-processing center 1510. According to one embodiment, the verification module 1524 verifies that the received test documents correspond to the distributed test documents. According to one embodiment, the reporting module 1526 reports information regarding the shipped test documents. In one embodiment, the test-taker population is updated on-line through the communication module 1537 so as to identify the test-takers 1536 who actually completed the test documents.

One embodiment of the test-processing center 1510 includes a test-processing area 1560 or areas in which the completed test documents are evaluated. In one embodiment, the test-processing area 1560 includes optical mark recognition (OMR) equipment for evaluating objective questions 1548. In one embodiment, the test-processing area 1560 includes scanners for scanning open-ended portions of the test documents to be dealt to a reader 1552 and evaluated. In one embodiment, the test-processing area 1560 includes scanners that acquire images of both objective 1548 and open-ended 1550 portions of the tests. Image processing software processes the scanned images to evaluate the objective and open-ended responses.

One embodiment of the test-processing center 1510 includes an inventory area or areas 1562. The inventory area 1510 includes a Work-In-Progress (WIP) area 1564 in which test documents are grouped and stored during processing. In one embodiment, the test documents are grouped in the WIP area 1564 on labeled pallets. In one embodiment, the test documents are grouped in the WIP area 1564 according to a project-determined priority. The WIP area 1564 is in communication with the server 1514, and particularly with the tracking module 1534 and the database 1520 to track the location and status within the inventory area 1562. The verification module 1524 is capable of verifying the progress of the test documents at various points along the process.

The inventory area 1510 also includes an archive area 1566. In one embodiment, the archive area 1566, or a portion thereof, is located within the test-processing center 1510. In one embodiment, the archive area 1566, or a portion thereof, is located off-site from the test-processing center 1510. The archive area 1566 is in communication with the server 1514, and particularly with the tracking module 1534 and the database 1520 to track the location and status within the inventory area 1562. According to one embodiment, the archive area 1566 stores physical documents. According to one embodiment, the archive area 1566 stores electronic files of test images, test results and/or reports, and these are available for on-line retrieval. In one embodiment, the test results are retrieved by a number of persons within the test-processing center 1510 using an intranet network, for example. In one embodiment, the test results are retrieved by a customer, such as test administrators or teachers, for example.

As provided above, sub-processes for processing standardized tests are capable of receiving and using priority information to efficiently process tests. One sub-process relating to receiving boxes of test booklets was shown and described above with respect to FIGS. 11–15. Another sub-process, as shown and described below with respect to FIGS. 16–20, relates to the presentation of scoring tasks to readers.

Figure 16:
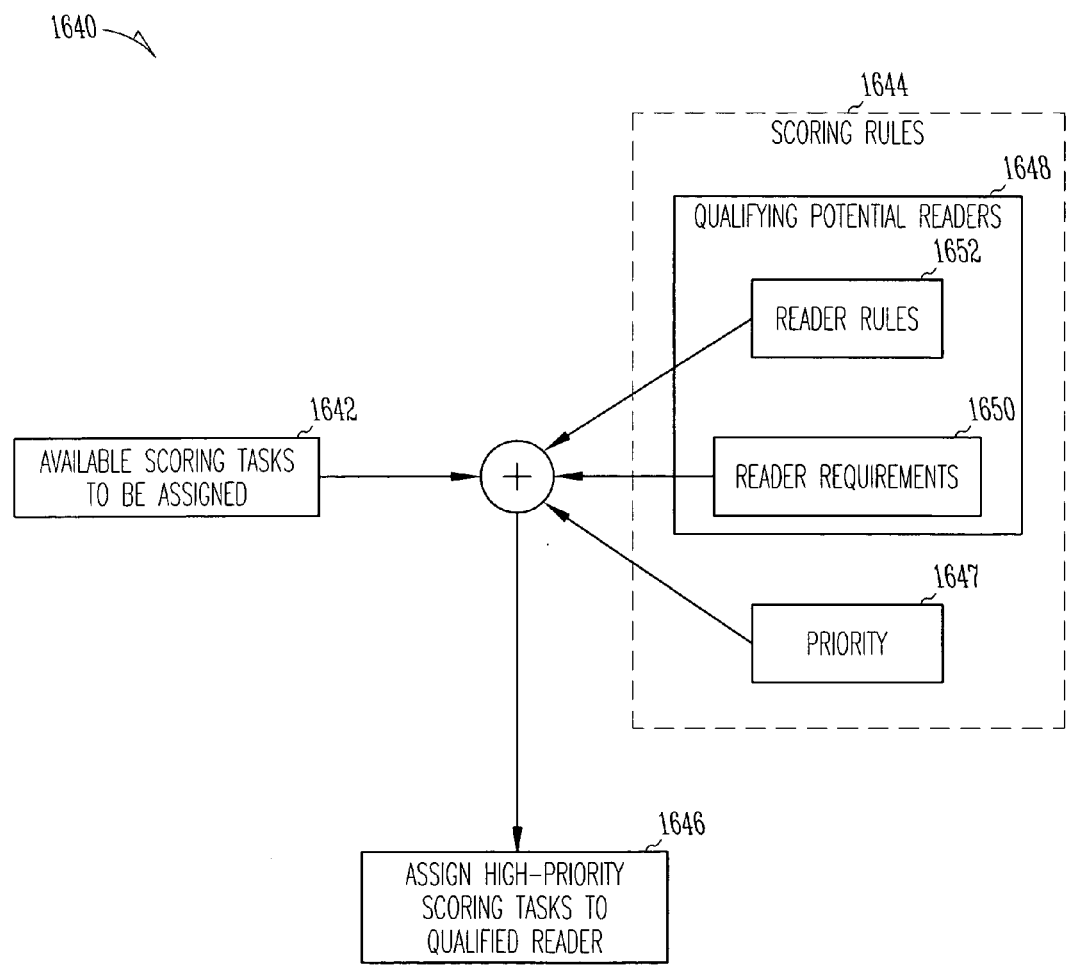
FIG. 16 illustrates one embodiment of a method for assigning a plurality of electronic test items to a plurality of readers.

FIG. 16 illustrates one embodiment of a method 1640 for assigning a plurality of electronic test items to a plurality of readers. As represented by 1642, a number of scoring tasks are available to be assigned. In various embodiments, these scoring tasks include various clipped portions or instances of test images. Scoring rules, represented generally as 1644, are applied to the scoring tasks, and high-priority scoring tasks are assigned to qualified readers at 1646. According to one embodiment, the scoring rules 1644 include priority rules 1647 used to determine whether the evaluation of a scoring task is a high-priority or a lower priority. In one embodiment, the scoring rules 1644 include rules for qualifying potential readers for each scoring task as represented at 1648. In one embodiment, for example, qualifying potential readers 1648 includes applying one or more reader requirements for reading the scoring tasks as represented at 1650, and applying one or more reader rules for reviewing the scoring tasks as represented at 1652.

Reader requirements are described below with respect to FIG. 17. Examples of a reader requirements include requiring that a reader have appropriate credentials to evaluate scoring tasks for a certain grade level such as a third grade reader, and to evaluate certain scoring tasks in certain subject matters such as math or science. Reader rules are described below with respect to FIG. 18. Examples of reader rules include a maximum percentage of a single test that can be evaluated by a single reader, and other rules for distributing scoring tasks among readers according to their current workload and their capacity to evaluate additional scoring tasks.

Figure 17:
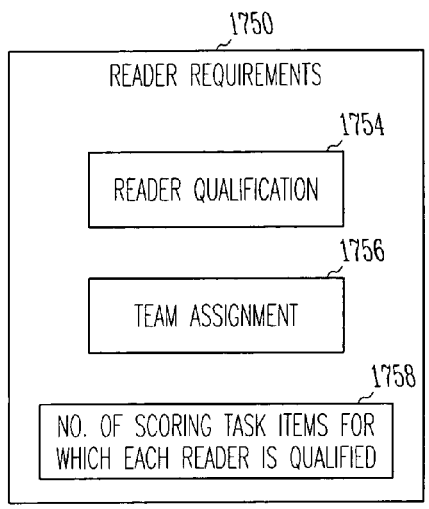
FIG. 17 illustrates one embodiment for the reader requirements of FIG. 16.

FIG. 17 illustrates one embodiment for the reader requirements of FIG. 16. In one embodiment, the reader requirements 1750 include a reader qualification rule 1754. Examples of a reader qualification rule 1754 include a third grade math qualification for evaluating third grade math scoring tasks, and an eighth grade science qualification for evaluating eighth grade science scoring tasks, and the like. In one embodiment, the reader requirements 1750 include a team assignment rule 1756. For example, the scoring tasks are distributed among the members of a scoring team or scoring teams. The team members are considered to be qualified to evaluate the scoring task type, and are dealt the scoring task if other applicable rules are satisfied. In one embodiment, the reader requirements 1750 include the number of scoring task items 1758 for which each reader is qualified. This information is capable of being used in a variety of distribution algorithms to promote efficient evaluation and processing through the distribution of an appropriate quantity and type of scoring tasks to the readers.

Figure 18:
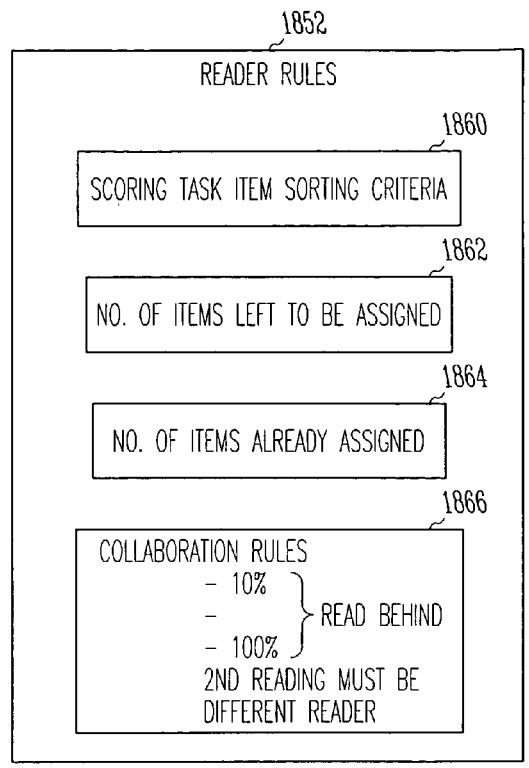
FIG. 18 illustrates one embodiment for the reader rules of FIG. 16.

FIG. 18 illustrates one embodiment for the reader rules of FIG. 16. In one embodiment, the reader rules 1852 include sorting criteria for scoring task items 1860. Examples of sorting criteria include sorting by school and sorting by class. This information is capable of being used in a variety of rules, such as ensuring that a single reader does not evaluate more than a certain percentage of scoring task items for a class, for example.

In one embodiment, the reader rules 1852 include the number of items left to be assigned to readers 1862, and the number of items already assigned to readers 1864. This information is capable of being used to appropriately distribute the remaining test items to the qualified readers. According to one embodiment, the items are distributed to provide an equal distribution among the qualified readers. In one embodiment, the items are distributed so as to promote efficient evaluating and processing by distributing more items to more efficient readers. In one embodiment, the efficiency and performance of the readers is monitored and dynamically updated based on the monitored efficiency and performance to accurately reflect a current status and to further improve the efficiency of the distribution process through an automated process. According to various embodiments, the efficiency and performance of the readers is monitored and/or dynamically updated periodically or in a real time or near real-time manner.

In one embodiment, the reader rules 1852 include collaboration rules 1866 to maintain the quality of the scoring process. Examples of collaboration rules 1866 include read-behind rules. A 10% read-behind rule requires that 10% of all scoring task items are read by a second reader. A 100% read-behind rule requires that all of the scoring task items are read by a second reader. Another example of a collaboration rule 1866 requires that the second evaluation of a scoring task item is performed by a second reader. Another collaboration rule example provides a mechanism for resolving different scores from the first and second reader. For example, one embodiment of the mechanism requires a third reader or supervisor to evaluate scoring task items that have different scores. In one embodiment, the read-behind for individual readers is dynamic, such that more scoring task items are read a second time for individual readers whose scores have differed significantly from other readers.

Figure 19:
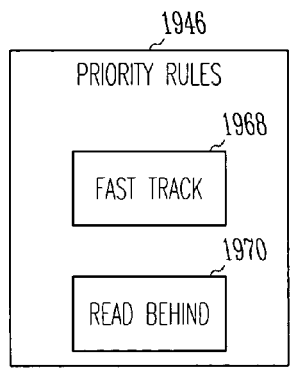
FIG. 19 illustrates one embodiment for the priority rules of FIG. 16.

FIG. 19 illustrates one embodiment for the priority rules of FIG. 16. In one embodiment, the priority rules 1946 include assigning a high priority to the evaluation of predetermined "fast track items" 1968. For example, a school district or state may require reports of score results for certain subjects or classes sooner than other reports. These subjects or classes are classified as fast track items. One of ordinary skill in the art will understand, upon reading and comprehending this disclosure, that a scoring task item is capable of being classified as either a fast track item or not a fast track item, and that a scoring task item is capable of being classified into one of many potential fast track levels to appropriately prioritize the evaluation of these scoring task items. In one embodiment, the priority rules 1946 include assigning a high priority to those scoring task items that have been selected as read-behind items 1970.

Figure 20:
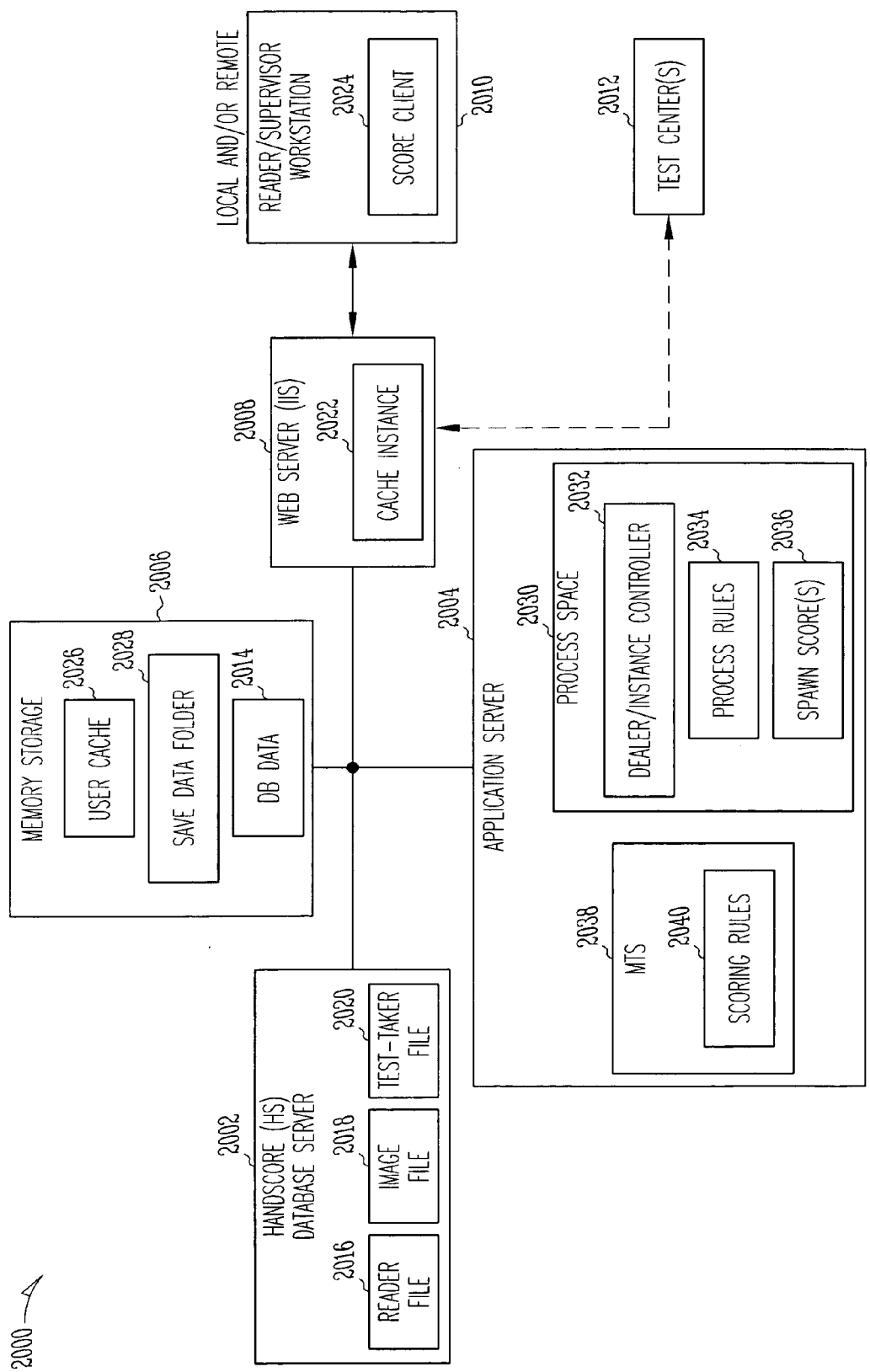
FIG. 20 illustrates one embodiment of a system for distributing a plurality of test items to a plurality of readers.

FIG. 20 illustrates one embodiment of a system for distributing a plurality of test items to a plurality of readers. In one embodiment, the system 2000 operates in the test-processing center 204 shown in FIG. 2. The system 2000 includes a database server 2002, illustrated as a hand score (HS) database server for processing open-ended scoring tasks, and an application server 2004 in communication with the database server 2002. The figure also illustrates that the system 2000 includes a memory storage 2006 in communication with the application server 2004 and the database server 2002. One of ordinary skill in the art will understand, upon reading and comprehending this disclosure, that the memory storage 2006 is capable of being organized in a number of ways. For example, the memory storage 2006 is capable of being organized as a central memory storage for the databases and for the various applications operating on the application server. The memory storage 2006 also is capable of being organized as a number of individual memory storage areas associated with the various applications and database.

In one embodiment, the system 2000 includes a web server 2008 in communication with the database server 2002, the application server 2004 and the memory storage 2006. One example of a web server 2008 is the Microsoft Windows NT Internet Information Server (IIS). One of ordinary skill in the art will understand, upon reading and comprehending this disclosure, that the web server 2008 is capable of functioning as an interface for both readers and supervisors, and that the web server 2008 allows reader and supervisor workstations 2010 to be positioned in local and/or remote locations.

One of ordinary skill in the art also will understand, upon reading and comprehending this disclosure, that the web server 2008 is capable of functioning as an interface to the test-taking centers where the standardized tests are administered. The test, or at least portions thereof, are capable of being completed on a computer or other electronic device, either on-line or off-line with respect to the web server. The answers for the test are capable of being received from the test-taking center(s) 2012 to the web server. The scored results of the tests are capable of being reported to the test-taking center(s) 2012 through the web server.

In one embodiment, the database server 2002 and the associated memory storage, as represented by the database data 2014, include a reader file 2016, and image file 2018, and a test taker file 2020. The reader file 2016 identifies a plurality of readers and credentials for the readers. The image file 2018 includes images of a plurality of test items and associates each image with one or more reader requirements and an evaluation priority. The test-taker file 2020 associates a test-taker with one or more images of the plurality of test items.

In one embodiment, the web server 2008 includes a cache instance component 2022 to cache one or more images to be distributed to the one or more readers. In one embodiment, the cached images are assigned to one of the one or more readers at the web server 2008. In another embodiment, the images are assigned to one of the one or more readers by the application server 2004 prior to being cached at the web server 2008. The cached images are stored in a user cache memory space 2026, illustrated within the memory storage 2006 in FIG. 20.

A score client application 2024 operates on the work station 2010. A reader evaluates a scoring task item, or image, and uses the score client application 2024 to create a score file that contains a score for one or more of the images. The score client 2024 uploads the score file to the web server 2008. In one embodiment, the uploaded score file is stored in a save data folder 2028, illustrated within the memory storage 2006 in FIG. 20.

The application server 2004 includes a process space 2030. A dealer 2032, also referred to as an instance controller, operates in the process space 2030. The dealer 2032 controls the distribution of the scoring task items to the readers. A process rules application 2034 also operates in the process space. The process rules application 2034 retrieves and applies process rules to score files, which are the files that are created when the reader evaluates the scoring task items at the workstation 2010. The process rules application 2034 is capable of spawning one or more spawn score application threads 2036 in the process space 2030. One definition of a thread is one individual process within a single application. A thread can be defined as a sequence of computing instructions. Each thread is capable of executing independently and on a separate processor from the other threads. In operation, each spawn score application thread 2036 reads the score file and sends the score file to the scoring rules application. The application server 2004 also includes a transaction server 2038, illustrated as a Microsoft Transaction Server (MTS), and a scoring rules application 2040 operating on the transaction server 2038 that processes the score file and updates a database operating on the database server 2002.

As has been provided above, the present subject matter provides systems and methods for prioritizing the processing of standardized tests. The present subject matter allows a test process to follow external time constraints, such as those time constraints provided by the customer. The present subject matter also allows a test process to follow internal time constraints, such as those time constraints designed for implementing efficient processing of the standardized tests.

This disclosure refers to several figures that resemble flow diagrams. One of ordinary skill in the art will understand, upon reading and comprehending this disclosure, that the methods related to the flow diagrams may occur in the order as illustrated in the flow diagrams, and may be ordered in another manner. Thus, the present subject matter is not limited to a particular order or logical arrangement.

Although specific embodiments have been illustrated and described herein, it will be appreciated by those of ordinary skill in the art that any arrangement which is calculated to achieve the same purpose may be substituted for the specific embodiments shown. This application is intended to cover adaptations or variations of the present subject matter. It is to be understood that the above description is intended to be illustrative, and not restrictive. Combinations of the above embodiments, and other embodiments, will be apparent to those of skill in the art upon reviewing the above description. The scope of the present subject matter should be determined with reference to the appended claims, along with the full scope of equivalents to which such claims are entitled.

What is claimed is:

1. A system for processing completed standardized tests, comprising:
   means for associating test-processing priority information with machine-readable identifiers for standardized tests;
   means for reading the machine-readable identifiers for the standardized tests to identify the standardized tests;
   means for automatically prioritizing identified standardized tests using the associated test-processing priority information; and
   means for processing the identified standardized tests according to the associated test-processing priority information such that higher-priority tests are processed before lower-priority tests.

2. The system of claim 1, further comprising means for electronically receiving a plurality of completed test items as a digital signal from a plurality of test-taking centers, wherein the means for reading the machine-readable identifiers for the standardized tests includes means for reading an electronic identifier for electronically-received test items.

3. The system of claim 1, wherein:
the means for associating test-processing priority information with machine-readable identifiers for standardized tests includes means for associating test-processing priority information with machine-readable identifiers for boxes of completed test booklets and with machine-readable identifiers for the completed test booklets within the boxes; and
the means for reading the machine-readable identifiers for the standardized tests includes means for reading the machine-readable identifiers for boxes of completed test booklets and means for reading the machine-readable identifiers for the test booklets.

4. The system of claim 3, wherein the machine-readable identifiers includes bar codes.

5. The system of claim 1, further comprising means for receiving the test-processing priority information from a customer.

6. The system of claim 1, further comprising means for receiving test-processing priority information from a test-processing center.

7. The system of claim 6, wherein the means for receiving test-processing priority information from a test-processing center includes:
means for receiving initial test-processing priority information for a test project; and
means for receiving test-processing priority information from test-processing feedback to provide dynamic prioritization, including means for receiving information regarding reader workload and means for receiving status information for tests that are in process.

8. The system of claim 1, wherein the test priority information includes three or more priority levels.

9. A system for processing completed standardized tests, comprising:
one or more reading devices for machine-reading test identifiers for a plurality of tests; and
a server connected to the one or more reading devices, the server including:
a database module for associating test identifiers with test-processing priority information, the priority-information including processing time constraints; and
at least one applications module to process the tests according to the test-processing priority information associated with the test identifiers.

10. The system of claim 9, wherein the processing time constraints include customer-provided time constraints.

11. The system of claim 9, wherein the processing time constraints include internally-provided time constraints from a test-processing center for use to efficiently process tests.

12. The system of claim 9, wherein the at least one applications module includes a scoring application adapted to use the test-processing priority information to determine an order for scoring the test items.

13. The system of claim 9, wherein the at least one applications module includes a report generation application adapted to use the test-processing priority information to determine an order for generating reports.

14. The system of claim 9, wherein the test-identifiers include bar codes.

15. The system of claim 9, wherein the test-identifiers include electronic-identifiers.

16. The system of claim 9, wherein the test identifiers include test identifiers for digitally-transmitted tests.

17. The system of claim 9, wherein the test identifiers include test identifiers for standardized test documents that are associated with priority information for processing the standardized test documents.

18. The system of claim 9, wherein the test identifiers include:
box identifiers for boxes of standardized test documents that are associated with priority information for processing the boxes of standardized test documents; and
test document identifiers for standardized test documents that are associated with priority information for processing the standardized test documents.

19. A method for processing completed standardized tests, comprising:
associating test-processing priority information with machine-readable identifiers for test items;
reading the machine-readable identifier for each test item;
automatically prioritizing each test item using the test-processing priority information; and
processing the identified standardized test documents according to the associated test-processing priority information such that higher-priority test documents are processed before lower-priority test documents.

20. The method of claim 19, wherein processing the identified standardized test documents according to the associated test-processing priority information includes scoring higher priority test items before lower-priority test items.

21. The method of claim 19, wherein processing the identified standardized test documents according to the associated test-processing priority information includes generating reports for higher priority test items before lower-priority test items.

22. The method of claim 19, wherein automatically prioritizing each test item using the test-processing priority information includes using computer instruction to prioritize each test item in response to a start command provided as a user-input.

23. The method of claim 19, wherein automatically prioritizing each test item using the test-processing priority information includes using computer instruction to prioritize each test item at predetermined times.

24. The method of claim 19, wherein automatically prioritizing each test item using the test-processing priority information includes using computer instruction to prioritize each test item at periodic time intervals.

25. The method of claim 19, wherein automatically prioritizing each test item using the test-processing priority information includes using computer instruction to prioritize each test item in response to receiving test data.

26. The method of claim 19, further comprising receiving the test-processing priority information to be associated with machine-readable identifiers for test items from a customer.

27. The method of claim 19, further comprising receiving the test-processing priority information to be associated with machine-readable identifiers as test processing feedback from a test processing center.

* * * * *

UNITED STATES PATENT AND TRADEMARK OFFICE
CERTIFICATE OF CORRECTION

PATENT NO. : 7,035,748 B2
APPLICATION NO. : 10/894560
DATED : April 25, 2006
INVENTOR(S) : Gedlinske et al.

It is certified that error appears in the above-identified patent and that said Letters Patent is hereby corrected as shown below:

In column 19, line 64, in Claim 14, delete "test-identifiers" and insert - - test identifiers - -, therefor.

In column 20, line 1, in Claim 15, delete "test-identifiers" and insert - - test identifiers - -, therefor.

In column 20, line 62, in Claim 27, delete "test processing" and insert - - test-processing - -, therefor.

In column 20, line 63, in Claim 27, delete "test processing" and insert - - test-processing - -, therefor.

Signed and Sealed this

Twenty-fifth Day of July, 2006

JON W. DUDAS
*Director of the United States Patent and Trademark Office*